(12) United States Patent
Harger

(10) Patent No.: US 8,112,893 B2
(45) Date of Patent: Feb. 14, 2012

(54) CABLE CUTTER WITH RECIPROCATING CUTTING WHEEL FOR CUTTING FLEXIBLE CABLE

(75) Inventor: James Robert Harger, Rockford, IL (US)

(73) Assignee: Greenlee Textron Inc., Rockford, IL (US)

( * ) Notice: Subject to any disclaimer, the term of this patent is extended or adjusted under 35 U.S.C. 154(b) by 541 days.

(21) Appl. No.: 12/131,257

(22) Filed: Jun. 2, 2008

(65) Prior Publication Data

US 2008/0301950 A1  Dec. 11, 2008

Related U.S. Application Data

(60) Provisional application No. 60/942,255, filed on Jun. 6, 2007.

(51) Int. Cl.
*B21F 13/00* (2006.01)

(52) U.S. Cl. .............. 30/90.1; 30/90.2; 30/90.3; 30/90.8

(58) Field of Classification Search ................... 30/90.3, 30/90.8, 90.4, 90.2, 92.5, 2, 90.1, 90.6, 90.7; 81/9.4; 269/236; 83/456
See application file for complete search history.

(56) References Cited

U.S. PATENT DOCUMENTS

| | | | | | |
|---|---|---|---|---|---|
| 374,306 | A | * | 12/1887 | Keene .............................. | 83/456 |
| 427,098 | A | | 5/1890 | Meriam | |
| 1,904,044 | A | | 4/1933 | Guild | |
| 2,210,273 | A | | 8/1940 | Wildhaber | |
| 2,674,027 | A | * | 4/1954 | Kosinski ......................... | 30/90.3 |
| 2,769,280 | A | | 11/1956 | Comstock | |
| 3,938,248 | A | * | 2/1976 | Krampe .......................... | 30/90.4 |
| 4,173,137 | A | * | 11/1979 | Metje ............................. | 72/320 |
| 4,671,094 | A | * | 6/1987 | Break ............................. | 72/319 |
| 4,753,007 | A | * | 6/1988 | Weller ............................ | 30/90.3 |
| 4,769,909 | A | * | 9/1988 | Ducret ........................... | 30/90.3 |
| 4,813,144 | A | * | 3/1989 | Korb et al. ..................... | 30/90.3 |
| 4,884,339 | A | * | 12/1989 | Custin ............................ | 30/90.4 |
| 4,922,085 | A | | 5/1990 | Dannantt et al. | |
| 4,977,671 | A | * | 12/1990 | Ducret ............................ | 30/90.2 |
| 5,033,347 | A | | 7/1991 | Hillestad et al. | |
| 5,490,860 | A | | 2/1996 | Middle et al. | |
| 5,759,092 | A | | 6/1998 | Liu | |
| 5,784,789 | A | | 7/1998 | Vargas | |
| 6,959,580 | B2 | * | 11/2005 | Break ............................ | 72/319 |
| 2009/0151166 | A1 | * | 6/2009 | Hartranft ....................... | 30/90.3 |

* cited by examiner

*Primary Examiner* — Boyer D Ashley
*Assistant Examiner* — Omar Flores Sanchez
(74) *Attorney, Agent, or Firm* — Clark Hill PLC

(57) ABSTRACT

A cutting tool includes a frame, a shaft, a cutter and a cam. The shaft is rotatable about an axis. The cutter is coupled to the shaft such that rotation of the shaft about its axis causes rotation of the cutter about the shaft's axis. The cam is positioned around the shaft such that the cam contacts the frame upon rotation of the shaft. The cam has a cam surface which is distanced away from the axis of the shaft a varying amount such that contact of the cam with the frame upon rotation of the shaft causes the shaft, and thus the cutter, to reciprocate in a generally transverse direction relative to the axis of the shaft.

12 Claims, 21 Drawing Sheets

CABLE CUTTER WITH RECIPROCATING CUTTING WHEEL FOR CUTTING FLEXIBLE CABLE

CROSS-REFERENCE AND INCORPORATION BY REFERENCE

This application claims the domestic priority of U.S. Provisional Application Ser. No. 60/942,255, filed on Jun. 6, 2007, and entitled "Flexible Cable Cutter With Reciprocating Cutting Wheel". U.S. Provisional Application Ser. No. 60/942,255 is hereby incorporated by reference in its entirety.

FIELD OF THE INVENTION

The invention generally relates to cable cutters. More particularly, the invention relates to a cable cutter having a reciprocating cutting wheel for cutting flexible cable.

BACKGROUND OF THE INVENTION

Flexible cable is routinely used by electricians to route electrical wiring from one place to another. One popular kind of flexible cable is called basic armored cable or BX, and is made of metal which surrounds wires. This type of cable allows an electrician to snake wires in a multitude of paths without having to spend the time necessary to bend conduit. Hence, BX cable provides protection for wiring that is contained therein, similar to the protection afforded by conduit, without the negative of having to take a great deal of time to install the wiring. Obviously, it is often necessary to cut open BX cable in order to access the wires therein, for example, in order to terminate the wires. Consequently, tools have been developed over time that allow the armor of the cable to be split, which then allows a portion of the metallic shielding of the BX cable to be unwound, causing it to detach from the rest of the BX cable.

One of the challenges of cutting BX cable is that the blade must penetrate deep enough to cut the metallic shielding, but must not cut so deep that the insulation of the wires becomes nicked, as this could lead to a shorting of the wiring. This challenge has increased as the amount of space provided between the metallic shielding and the wires has been decreased substantially with newer types of BX cable. Furthermore, the different diameters of BX cable that are commonly used by electricians have increased over the years. The larger the diameter of the BX cable, the longer the cut made by a tool must be in order to allow the outer metallic shielding to unwind properly. Most cable cutters use a rotary cutting wheel that has some sort of depth adjustment device so that the user can increase the length of the cut of the tool so it can work on a wide range of BX cables with different diameters. Alternatively, a larger diameter cutting wheel could be used.

However, this necessarily means that as the user increases the length of the cut for BX cable with larger diameters, the depth of cut will also be increased. This has created a problem in that these types of tools will often nick the wires found within BX cables of larger diameters because there is not enough clearance between the shielding of the BX cable and the wires to allow for a deeper cut. Accordingly, there exists a need for a flexible cable cutter that facilitates the removal of the shielding of BX cables having larger diameters without necessarily increasing the depth of the cut, eliminating the possibility of nicking the insulation of the wires found within the flexible cable.

SUMMARY OF THE INVENTION

The present invention provides a cable cutter that has a frame member, a shaft member, a cutting wheel and a cam member. The shaft member is rotatable about an axis. The cutting wheel is coupled to the shaft member such that rotation of the shaft member about its axis causes rotation of the cutting wheel about the shaft member's axis. The cam member is positioned around the shaft member such that the cam member contacts the frame member upon rotation of the shaft member. The cam member has a cam surface which is distanced away from the axis of the shaft member a varying amount. Contact of the cam member with the frame member upon rotation of the shaft member causes the shaft member, and thus the cutting wheel, to reciprocate in a generally transverse direction relative to the axis of the shaft member.

In a first embodiment of the cable cutter, a bushing is provided around the shaft and has elongated teeth extending therefrom which mesh with teeth extending from the frame member in order to prevent the shaft from wobbling or twisting as the shaft rotates and translates. The shaft may be manually rotated by a handle or automatically rotated by a motor.

In a second embodiment of the cable cutter, the teeth of the frame member are removed and the bushing is replaced by a second cam member. Like the first cam member, the second cam member has a cam surface which is distanced away from the axis of the shaft member in varying amounts. The cam surface of the second cam member prevents the shaft from wobbling or twisting as the shaft rotates and translates.

In a third embodiment of the cable cutter, the second cam member is integrally formed with a handle used for imparting rotational movement, and thus reciprocating motion as well, to the shaft.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

Figure 1:
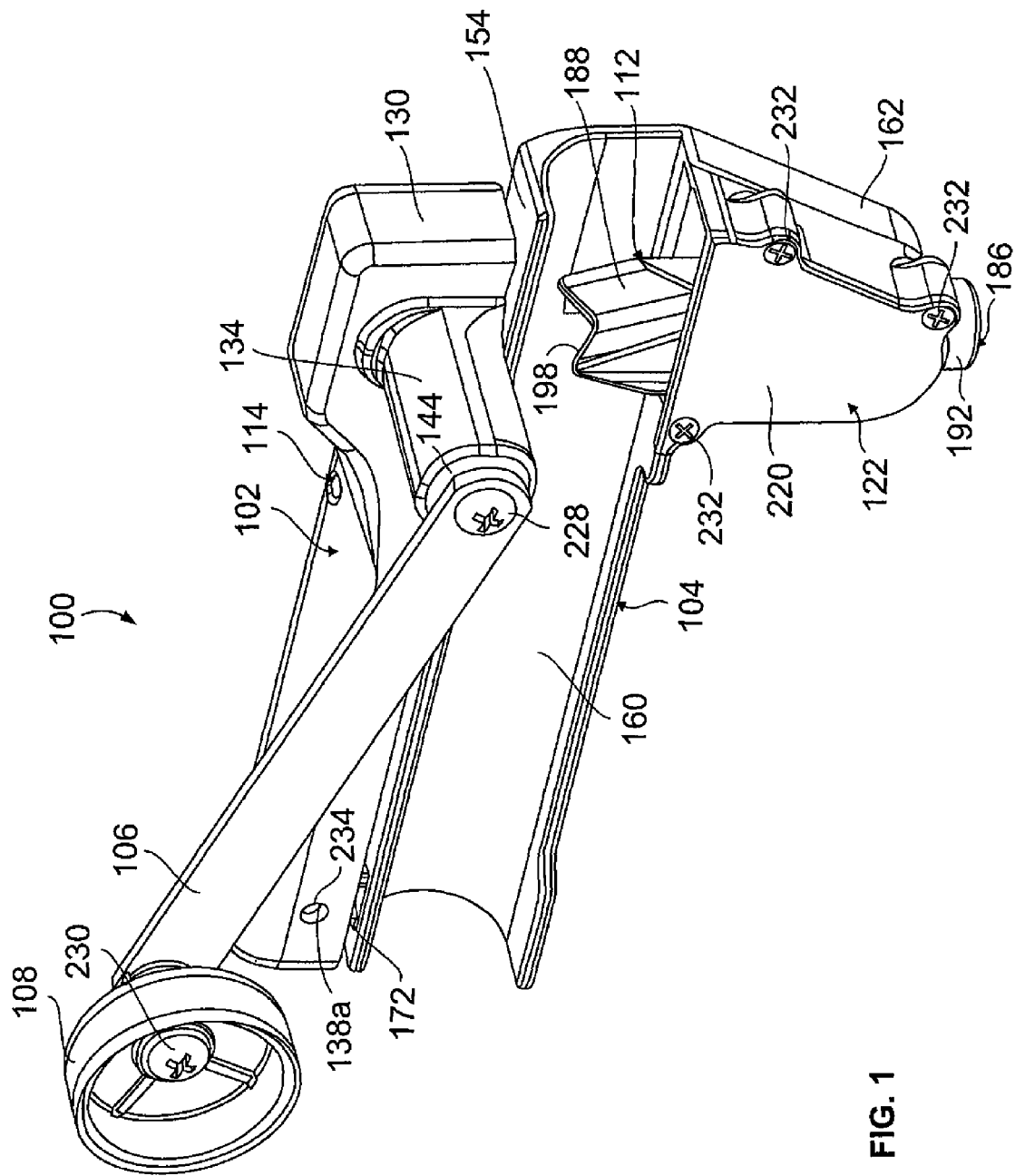
FIG. 1 is a perspective view of a first embodiment of a cable cutter which incorporates the features of the present invention.
Figure 2:
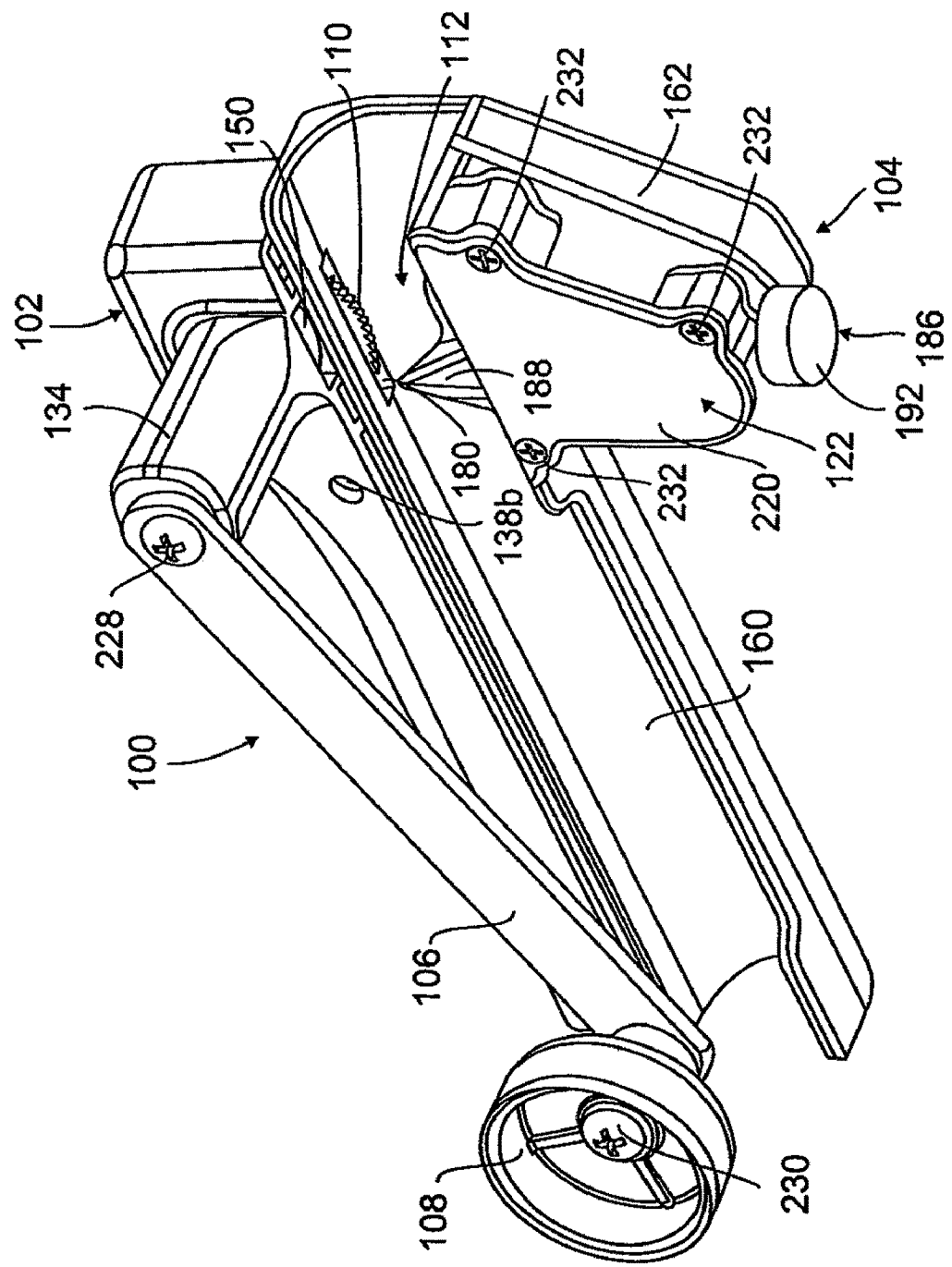
FIG. 2 is an alternative perspective view of the cable cutter illustrated in FIG. 1.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Attention is now invited to the various embodiments of a cable cutter for cutting flexible cable. A first embodiment of a cable cutter 100 is described herein and illustrated in FIGS. 1-20. A second embodiment of a cable cutter 300 is described herein and illustrated in FIG. 21. A third embodiment of a cable cutter 500 is described herein and illustrated in FIGS. 22 and 23. Like elements are denoted with like reference numerals with the first embodiment being in the one and two hundreds, the second embodiment being in the one, two, three and four hundreds, and the third embodiment being in the one, two, five and six hundreds. It is to be understood that the drawings are not necessarily drawn to scale.

Attention is invited to FIGS. 1-20 illustrating the first embodiment of the cable cutter 100. The cable cutter 100 includes a top frame member 102, a bottom frame member 104, a rotating handle 106, a cutting wheel 110, a clamping mechanism 112, a depth adjustment mechanism 114, a shaft 116, a cam member 118, a bushing 120, and a cover plate 122. The specifics of the structures of the individual components will be described first, and then a description of how all of the components are fit together is provided.

Figure 3:
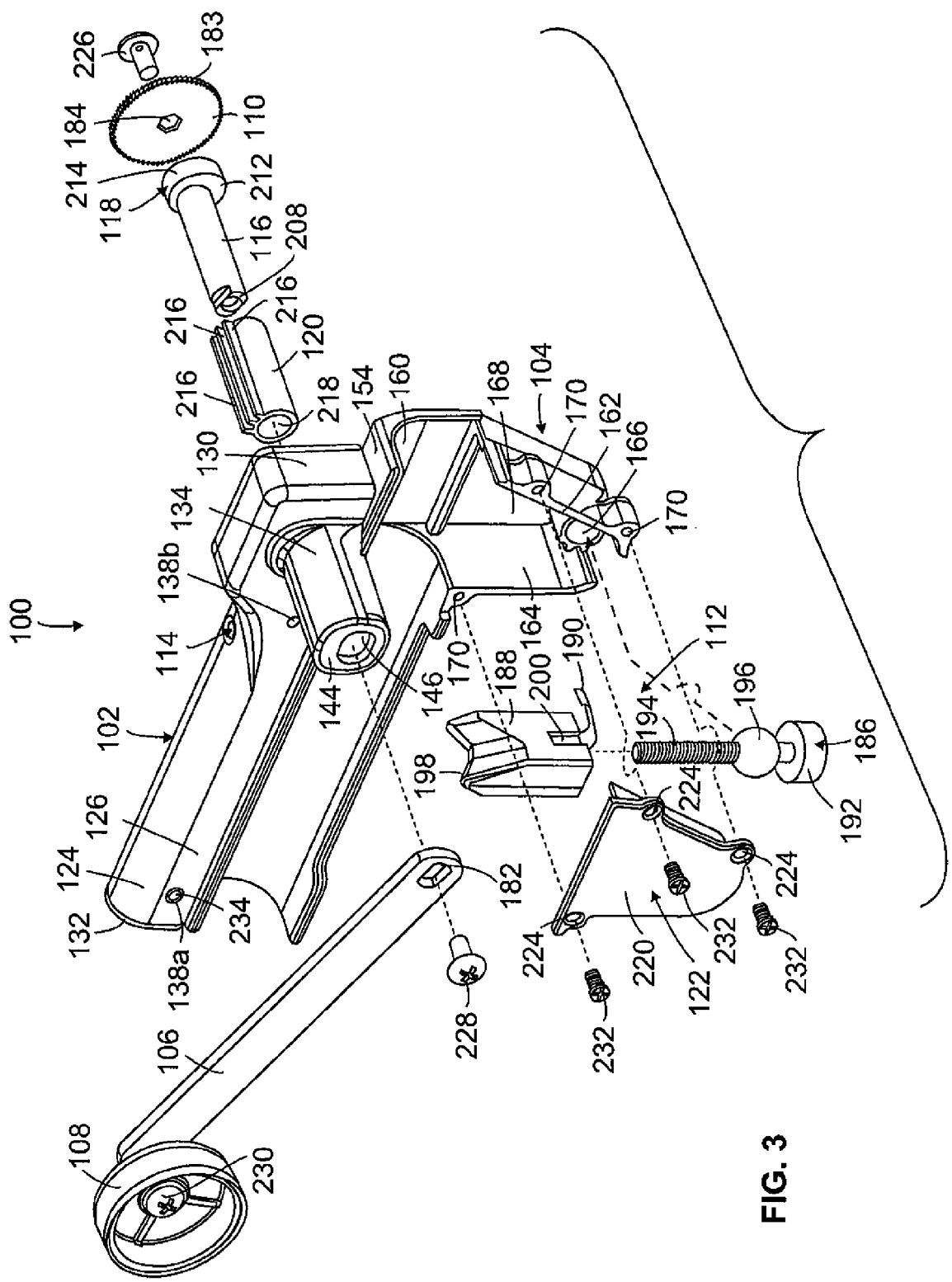
FIG. 3 is an exploded perspective view of the cable cutter illustrated in FIG. 1.

The top frame member 102 is best illustrated in FIG. 3. The top frame member 102 is preferably made of cast aluminum as this a cost-effective way to make frame members that have the proper amount of rigidity and strength to handle the cutting forces of the cable cutter 100, as well as wear and tear in the field. The top frame member 102 has first and second sidewalls 126, 128 which extend downwardly from opposite sides of an upper wall 124 such that an opening 136 is defined between the upper wall 124 and the first and second sidewalls 126, 128. A front wall 130 extends downwardly from a front end of the upper wall 124 and the first and second sidewalls 126, 128, and closes off accessibility to the opening 136 from the front end of the top frame member 102. A rear wall 132 extends downwardly from a rear end of the upper wall 124 and the first and second sidewalls 126, 128, and closes off accessibility to the opening 136 from the rear end of the top frame member 102.

Figure 16:
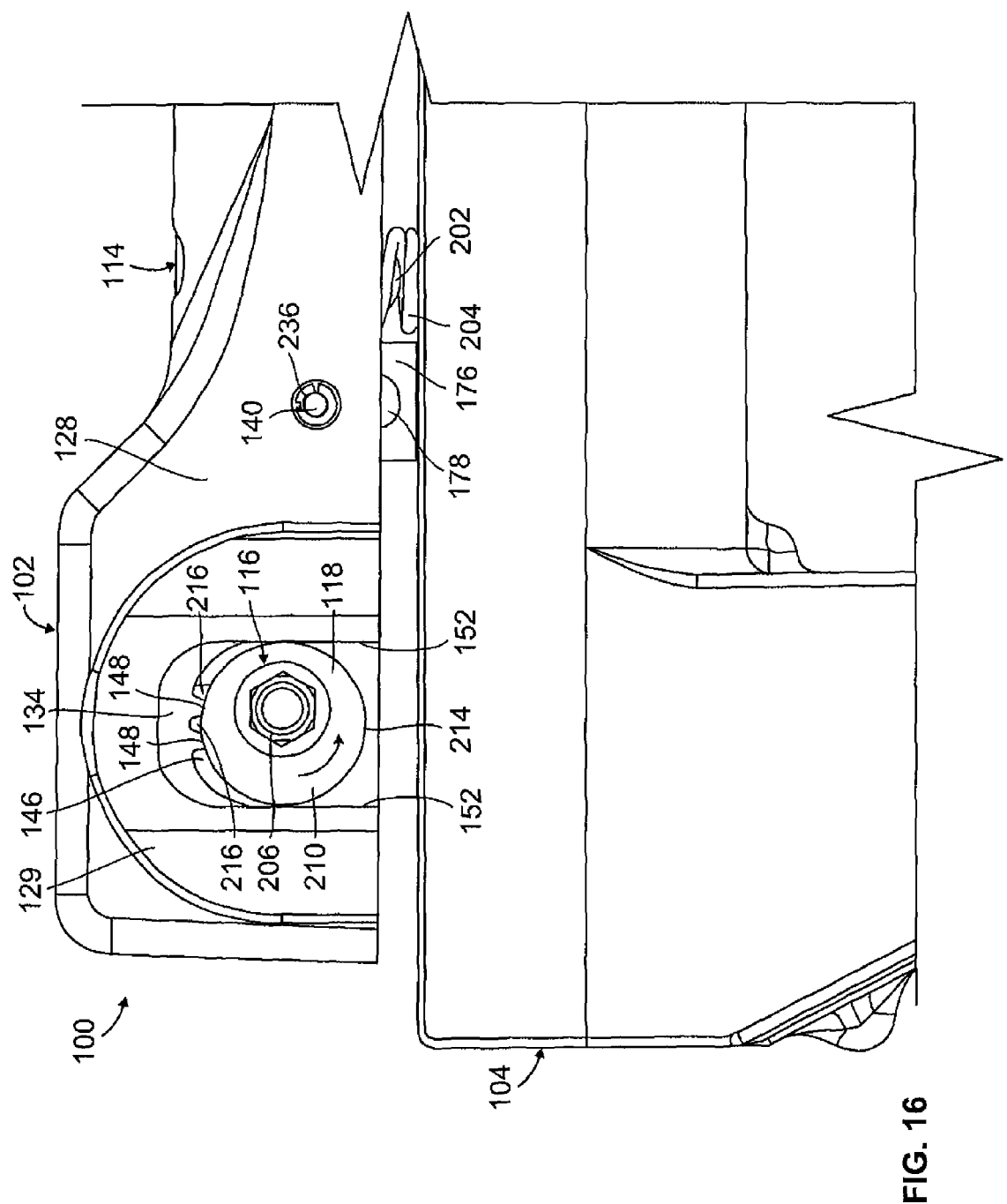
FIG. 16 is a rear view of the cable cutter illustrated in FIG. 13 with the cutting wheel removed.
Figure 17:
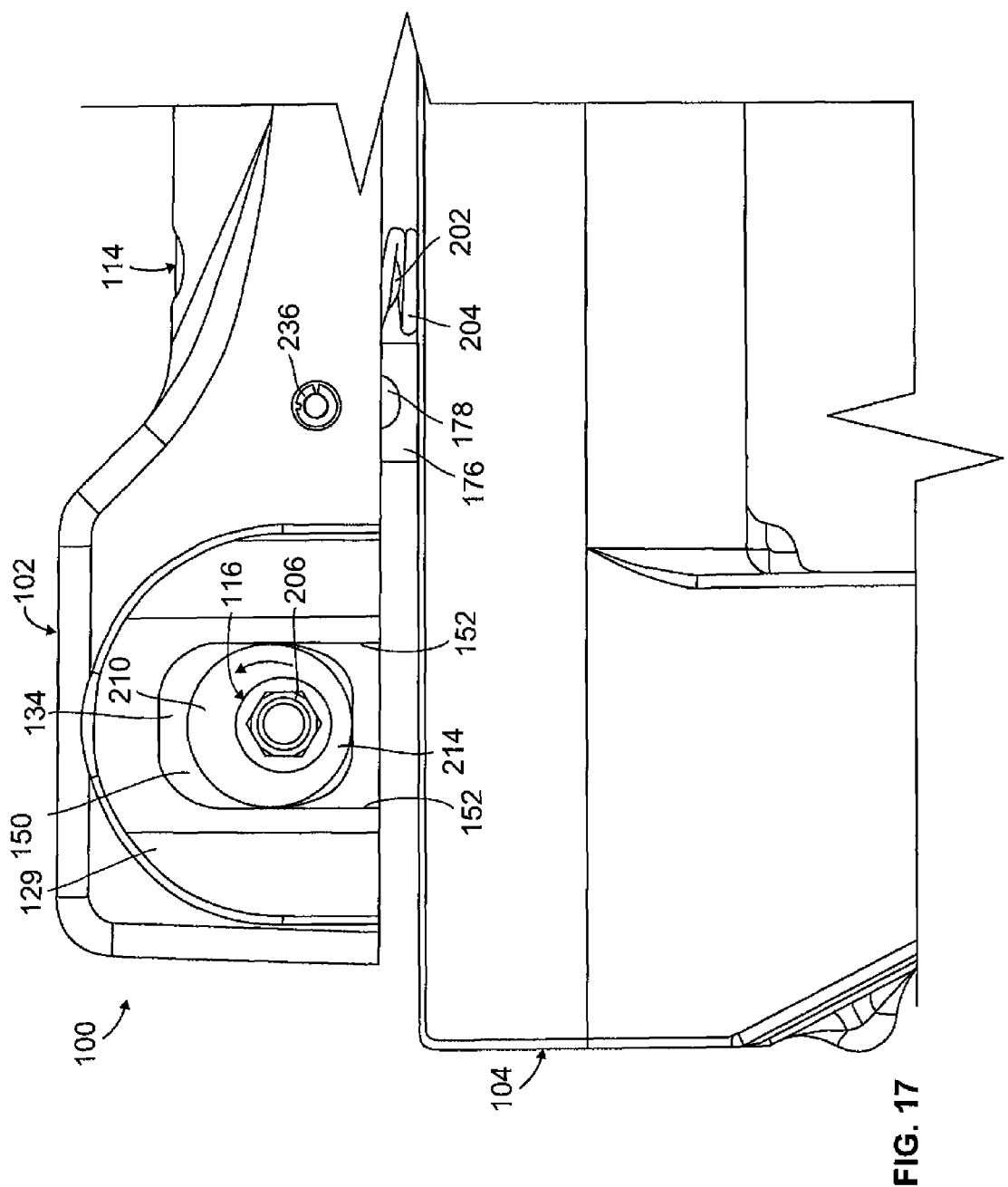
FIG. 17 is a rear view of the cable cutter illustrated in FIG. 14 with the cutting wheel removed.
Figure 18:
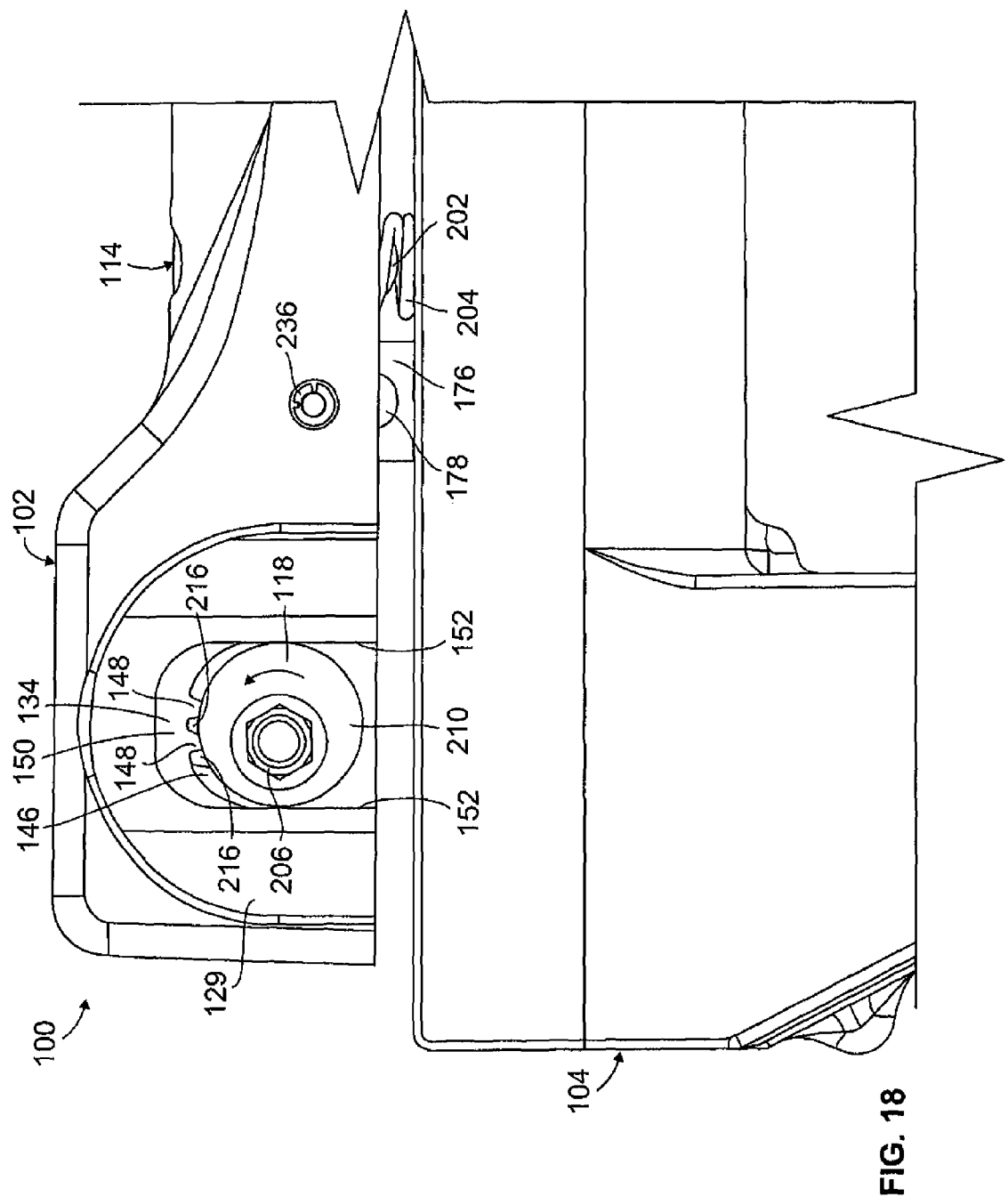
FIG. 18 is a rear view of the cable cutter illustrated in FIG. 15 with the cutting wheel removed.
Figure 19:
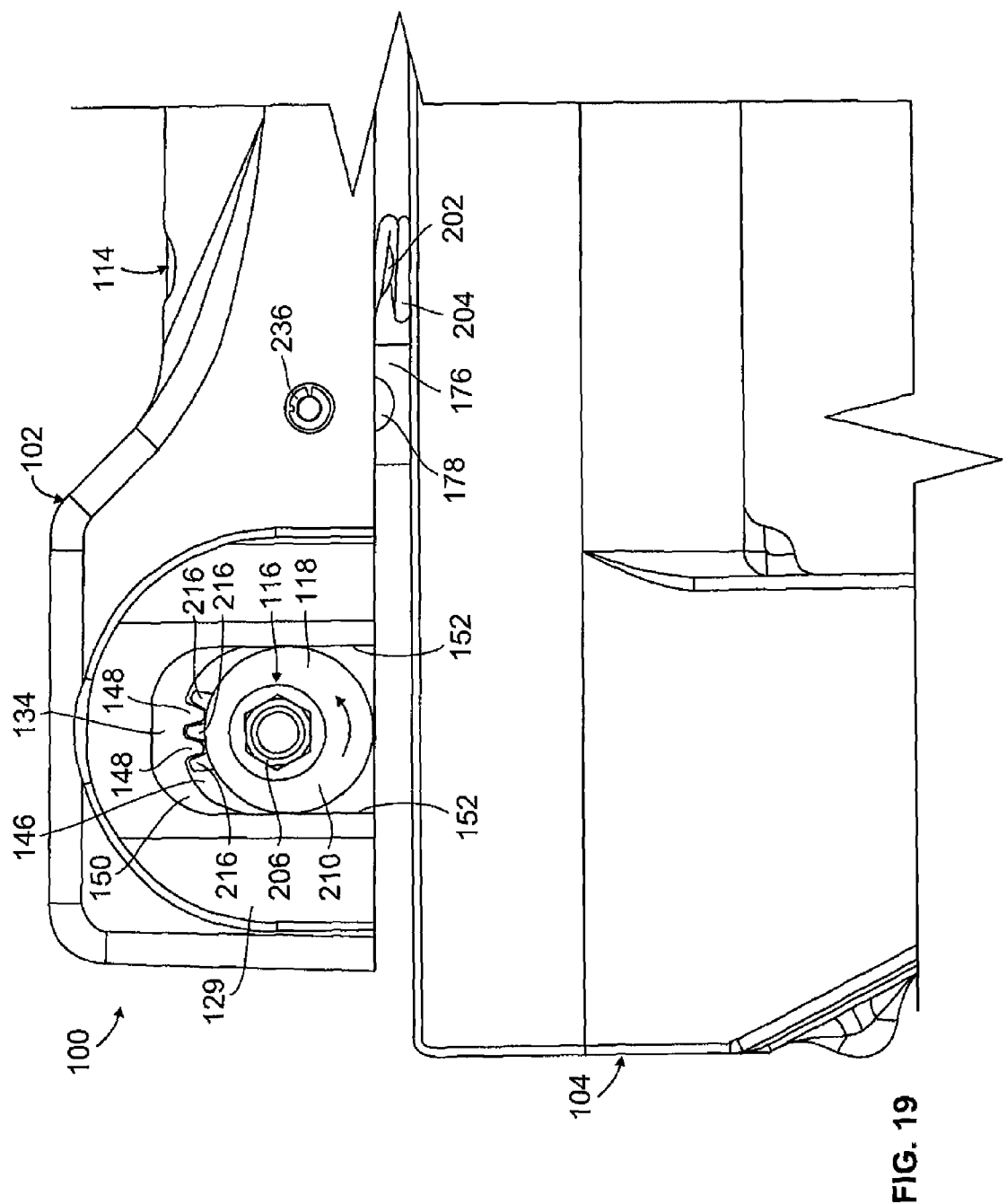
FIG. 19 is a rear view of the cable cutter illustrated in FIG. 16 with the cam member shown in the second middle position with respect to the top and bottom frame members.

The first and second sidewalls 126, 128 have enlarged portions proximate to the front end of the top frame member 102. As shown in FIG. 16, the sidewall 128 has a generally U-shaped cut-out 129 formed in the enlarged portion that is open to the opening 136 and to the lower edge of the sidewall 128.

Figure 5:
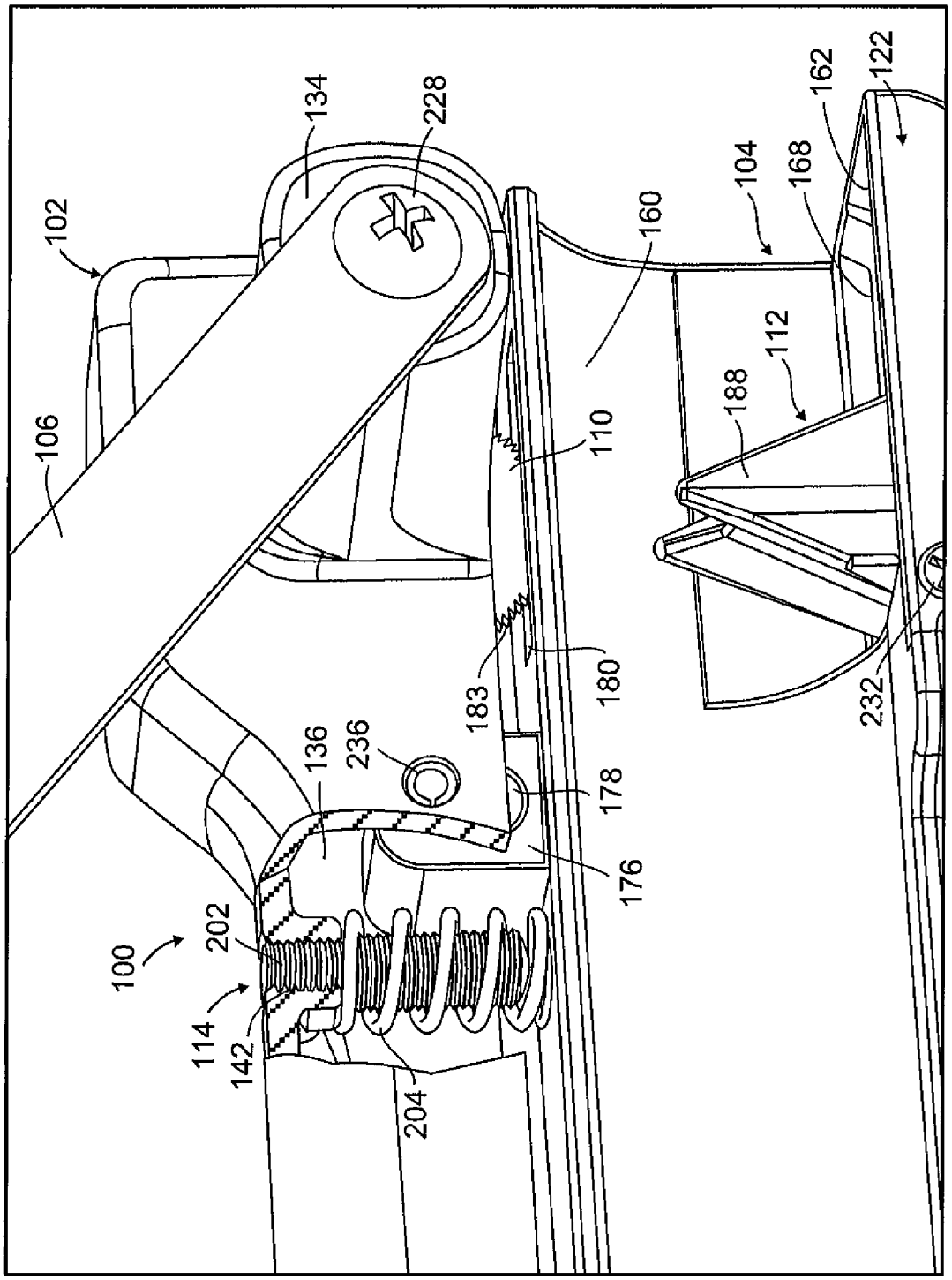
FIG. 5 is an enlarged view of the cable cutter illustrated in FIG. 1 with part of a top frame member removed so that the components of a depth adjustment mechanism can be more easily seen.

As shown in FIG. 3, the first sidewall 126 has two holes 138a, 138b therethrough. One of the holes 138a is provided proximate to the rear end of the top frame member 102 and the other 138b is provided proximate to or at the enlarged portion. Likewise, as shown in FIG. 16, the second sidewall 128 has two holes 140 extending therethrough. One of the holes 140 (which is not shown) is provided proximate to the rear end of the top frame member 102 and the other hole 140 is provided proximate to or at the enlarged portion such that the U-shaped cut-out 129 is positioned between the hole 140 and the front wall 130. Holes 138a, 138b are in alignment with holes 140. As shown in FIG. 5, a threaded hole 142 is also provided through the upper wall 124 proximate to the enlarged portions of the sidewalls 126, 128.

The guide housing 134 extends outwardly from the enlarged portion of the first sidewall 126. A free end 144 is formed at the end of the guide housing 134. A slot 146 which extends through the guide housing 134 is accessible through the free end 144 and is in communication with the opening 136 of the top frame member 102. Elongated teeth 148 extend downwardly into the slot 146 and run from proximate the connection of the guide housing 134 to the first sidewall 126 toward the free end 144 of the guide housing 134. Between the opening 136 and the slot 146, the guide housing 134 provides an enlarged cavity or pocket 150. The guide housing 134 provides sidewalls 152 on either side of the enlarged cavity 150.

Figure 4:
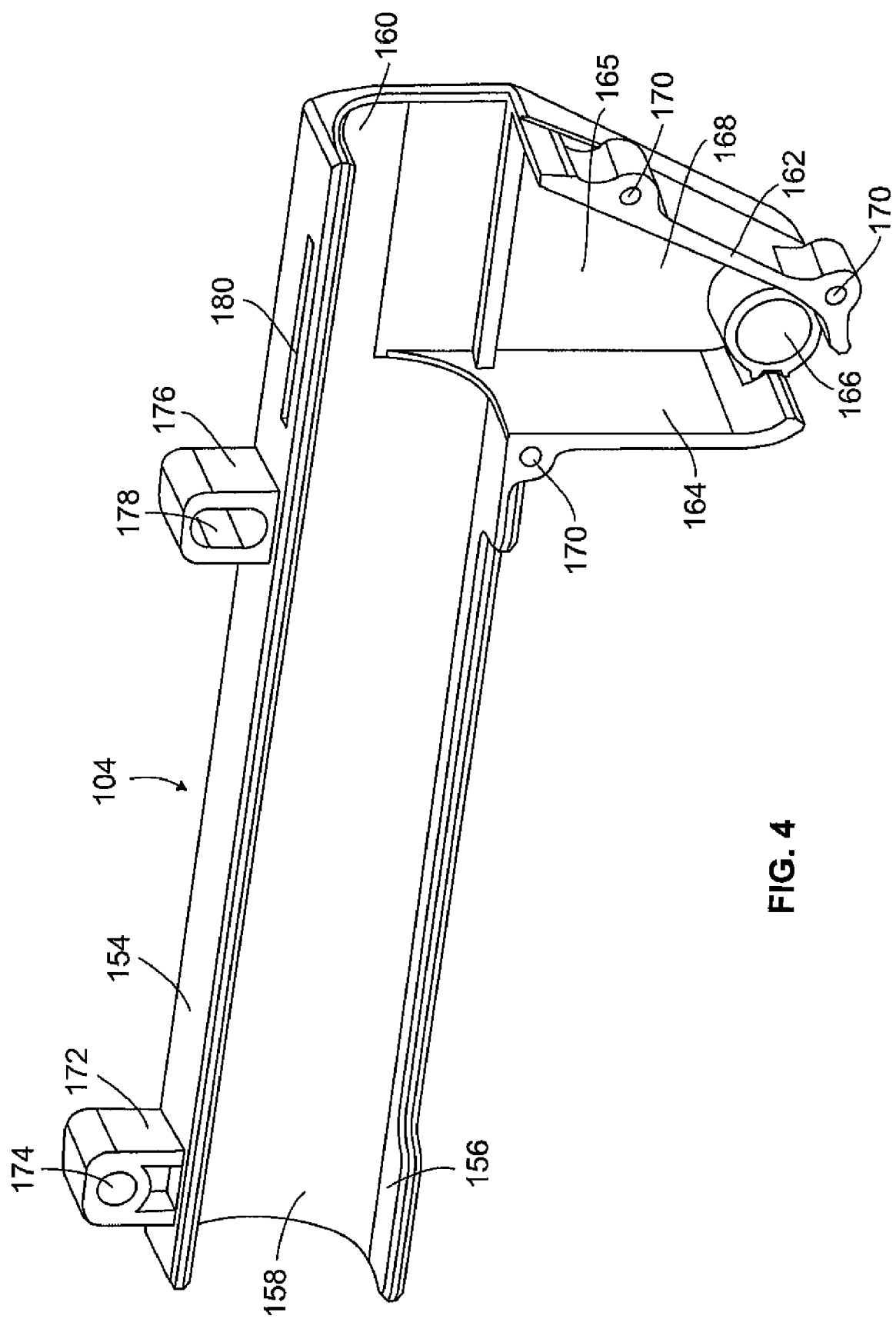
FIG. 4 is a perspective view of a bottom frame member of the cable cutter illustrated in FIG. 1.

The bottom frame member 104 is best illustrated in FIG. 4. The bottom frame member 104 is preferably made of cast aluminum as this a cost-effective way to make frame members that have the proper amount of rigidity and strength to handle the cutting forces of the cable cutter 100, as well as wear and tear in the field. The bottom frame member 104 has an upper wall 154, a lower wall 156, and a sidewall 158 which connects the upper wall 154 to the lower wall 156. The sidewall 158 is preferably curved between the upper and lower walls 154, 156 in order to provide a cable receiving groove 160 between the upper and lower walls 154, 156 and the sidewall 158. At a front end of the bottom frame member 104, a portion of the sidewall 158 and the lower wall 156 are cutaway. A socket mount is provided at the cutout and includes a first wall 162 at the front end of the bottom frame member 104 which extends downwardly from the lower wall 156, a second wall 164 which is spaced from the first wall 162 and which extends downwardly from the lower wall 156, and a side wall 165 provided therebetween which is generally parallel to the axis of the curved sidewall 158. A socket portion 166 is provided at the bottom of the sidewall 165. An opening 168 is defined between the first, second and side walls 162, 164, 165 and the socket portion 166. The first and second walls 162, 164 have holes 170 extending therein.

A first generally rectangular-shaped projection 172 extends upwardly from the upper wall 154, proximate to a rear end thereof. A second generally rectangular-shaped projection 176 extends upwardly from the upper wall 154, proximate to the front end thereof Holes 174, 178 respectively extend through the first and second generally rectangular-shaped projections 172, 176. Hole 178 is preferably larger than hole 174, as illustrated in FIG. 4. An elongated slot 180 is provided through the upper wall 154 between the front end thereof and the second generally rectangular-shaped projection 176, such that the slot 180 is generally positioned above the opening 168. The slot 180 runs transverse through the upper wall 154 relative to the holes 174, 178.

As shown in FIG. 3, the handle 106 is generally elongated and has a slot 182 provided proximate to a first end thereof The slot 182 has upper and lower flats and curved sides. The handle 106 also has a hole (not shown) provided proximate to a second, opposite end thereof. A generally circular hand wheel 108 is attached to a second end of the handle 106 by a fastener. The configuration of the hand wheel 108 is not germane to the invention and therefore, the hand wheel 108 can be configured in any desirable manner, whether it be circular or otherwise. The hand wheel 108 may also rotate relative to the handle 106 or may be fixed.

The cutting wheel 110 is generally circular and has an outer edge 183 configured for cutting through flexible cable 50, such as BX cable. A hole 184 is provided through a center of the cutting wheel 110. The hole 184 is preferably hex-shaped. The cutting wheel 110 may take on any form or perform any type of cutting desired such that different types of cutting wheels may be used, for example, a circular saw or a grinding wheel. The cutting wheel 110 is preferably formed of metal.

The clamping mechanism 112, as best illustrated in FIG. 3, is used to secure flexible cable 50 in place prior to the cutting wheel 110 cutting the flexible cable 50. The clamping mechanism 112 includes a thumb knob assembly 186, a cradle member 188 and a leaf spring 190. The thumb knob assembly 186 has a thumb wheel 192, a threaded portion 194 extending upwardly from the thumb wheel 192, and a ball portion 196 is integral with and found between the threaded portion 194 and the thumb wheel 192. The cradle member 188 has a generally V-shaped top portion 198, a threaded hole (not shown) extending through a bottom (not shown) thereof, and a slot 200 formed in a side thereof. The leaf spring 190 is positioned and secured within the slot 200, preferably by staking or adhesive, such that a portion of the leaf spring 190 extends outwardly from the side of the cradle member 188.

The depth adjustment mechanism 114 is best illustrated in FIG. 5 and includes a set screw 202 and a compression spring 204 which surrounds the set screw 202.

Figure 6:
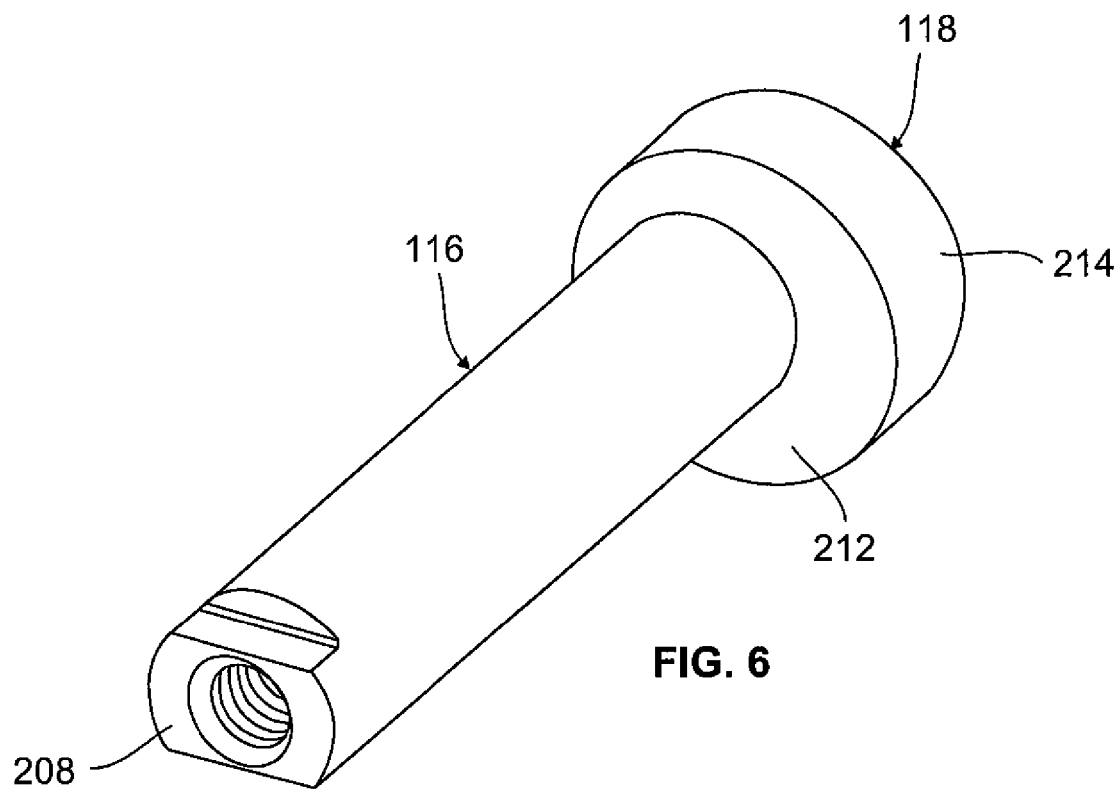
FIG. 6 is a front perspective view of a shaft and cam member of the cable cutter illustrated in FIG. 1.
Figure 7:
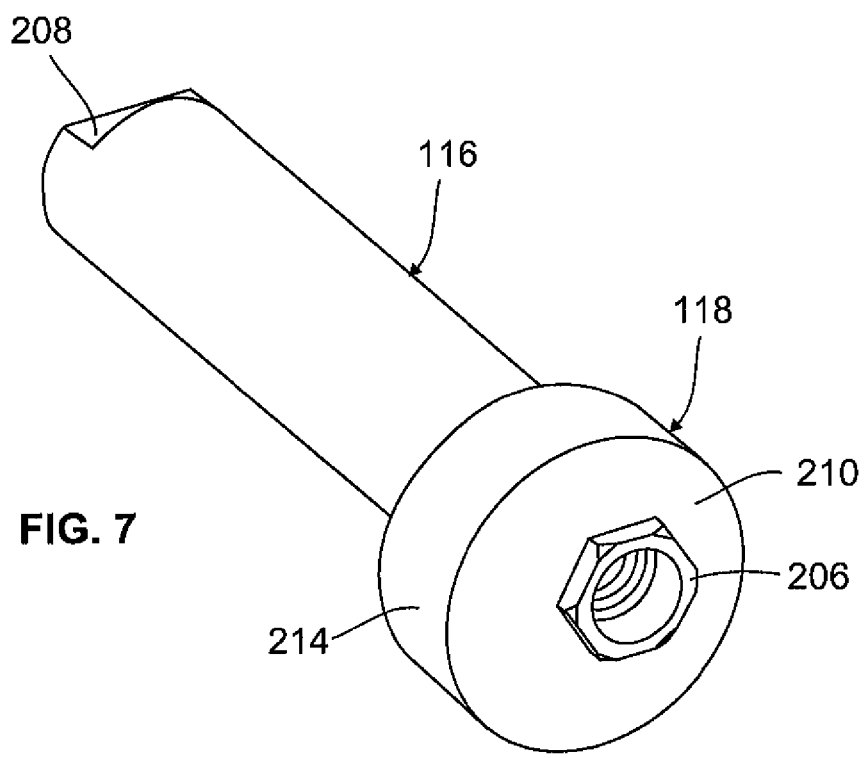
FIG. 7 is a rear perspective view of the shaft and cam member illustrated in FIG. 6.

The shaft 116 is best illustrated in FIGS. 6 and 7. The shaft 116 is generally cylindrical and has first and second opposite ends. The first end of the shaft 116 is provided with a hex-shaped boss 206 and the second end of the shaft 116 is provided with a boss 208 having upper and lower flats. Threaded apertures provided within the shaft 116 are accessible through the bosses 206, 208. The threaded apertures may be separated from one another or may be contiguous.

The cam member 118 is best illustrated in FIGS. 6 and 7. The cam member 118 is generally cylindrical and has first and second opposite end faces 210, 212 that are connected by an outer circumferential cam surface 214. The cam member 118 has a hole (not shown) which extends therethrough from the first end face 210 to the second end face 212, but the hole is provided off-center such that portions of the outer circumferential cam surface 214 are provided at a distance further away from the hole than other portions of the outer circumferential cam surface 214, i.e., different portions of the outer circumferential cam surface 214 are provided at varying distances from the hole. The cam member 118 is preferably made from steel or aluminum and can be made using a screw machine, a CNC lathe, or grinding techniques to produce the cam member 118 that is as accurate and economical to manufacture as possible.

The bushing 120 is best illustrated in FIG. 3. The bushing 120 is generally cylindrical and has first and second opposite ends that are connected by an outer circumferential surface. A plurality of elongated teeth 216 extend outwardly from the outer circumferential surface from the first end of the bushing 120 to the second end of the bushing 120. The bushing 120 further has a hole 218 extending therethrough from the first end of the bushing 120 to the second end of the bushing 120. The bushing 120 is preferably molded from nylon or acetal in order to avoid having two similar materials wear on each other and to ensure that smaller parts wear out before the more expensive top and bottom frame members 102, 104 do.

Figure 8:
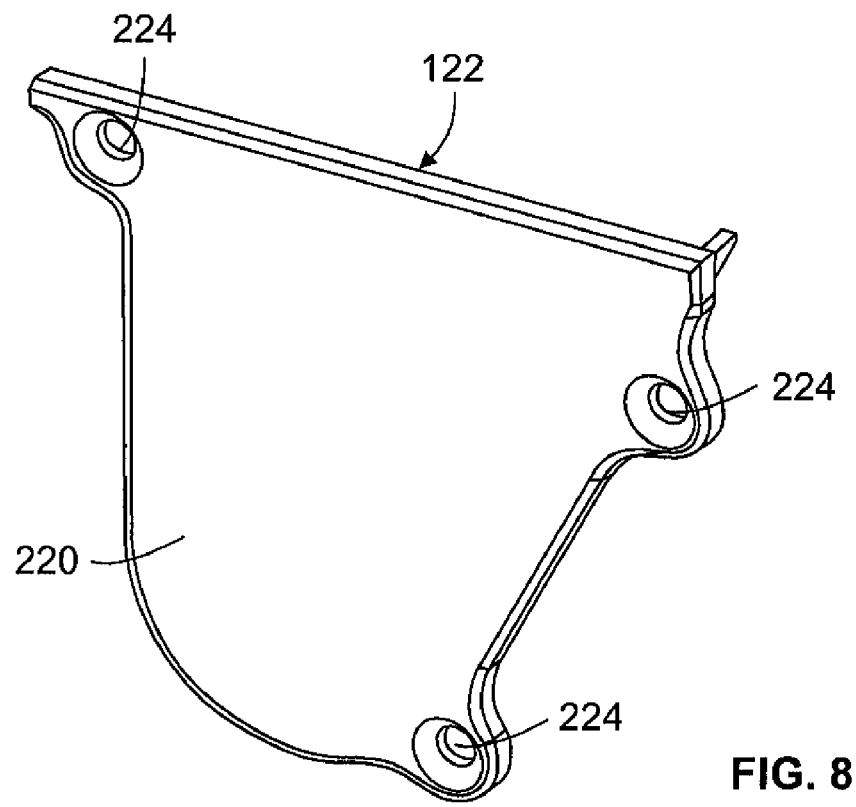
FIG. 8 is a front perspective view of a cover plate of the cable cutter illustrated in FIG. 1.
Figure 9:
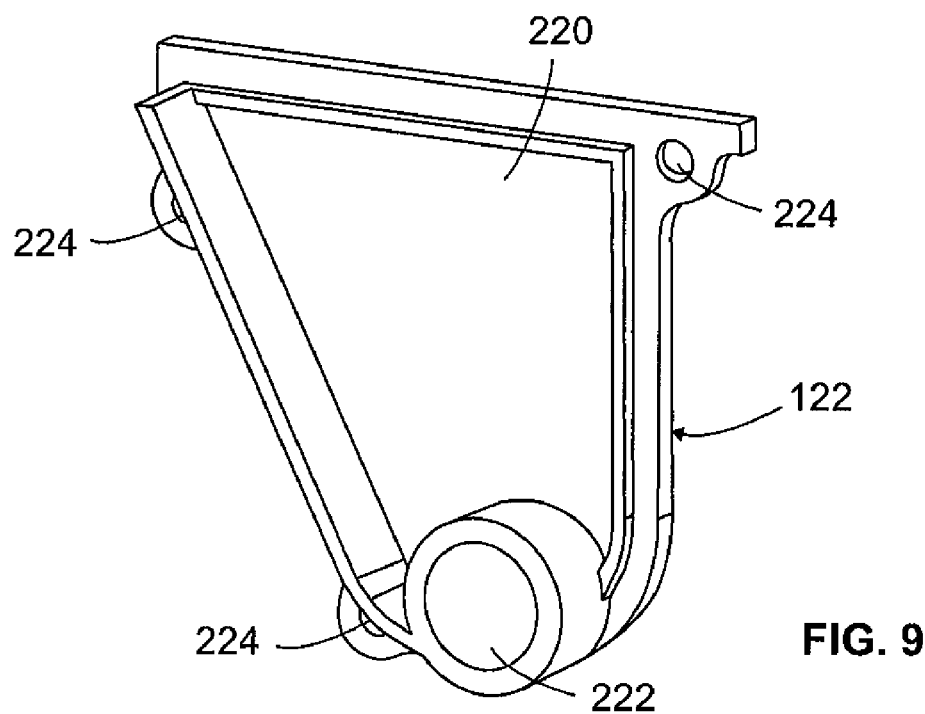
FIG. 9 is a rear perspective view of the cover plate illustrated in FIG. 8.

The cover plate 122 is best illustrated in FIGS. 8 and 9. The cover plate 122 has a wall portion 220 and a socket portion 222 extending inwardly from the wall portion 220 proximate to a bottom thereof. The wall portion 220 has holes 224 extending therethrough.

Unless otherwise described, all of the components of the cable cutter 100 can be made using processes commonly known in the art including milling and turning, etc., and can be readily purchased.

Assembly of the cable cutter 100 will now be discussed, although it is to be understood that the description of the assembly provided herein is only one manner in which the cable cutter 100 may be assembled. In order to assemble the cable cutter 100, first and second subassemblies are first formed. The first subassembly is formed by threading the set screw 202 into the threaded hole 142 in the upper wall 124 of the top frame member 102 such that a majority of the set screw 202 is positioned within the opening 136 of the top frame member 102. The top frame member 102 is then turned over such that a free end of the set screw 202 is pointing upward. As such, the compression spring 204 can be placed over the free end of the set screw 202 until it bottoms out on an inside surface of the upper wall 124 of the top frame member 102 without concern that the compression spring 204 will fall off of the set screw 202.

The shaft 116 is inserted into the hole of the cam member 118 such that the end of the shaft 116 with the hex-shaped boss 206 is flush with first end face 210 of the cam member 118. The cam member 118 is then held fixed to the shaft 116 by tightening a set screw (not shown) found along its outer circumferential cam surface 214. Alternatively, if desired, the shaft 116 and the cam member 118 could be made from a single piece of material with their features timed with respect to each other appropriately. The portions of the outer circumferential cam surface 214 are thus provided at varying distances relative to the axis of rotation of the shaft 116.

Figure 10:
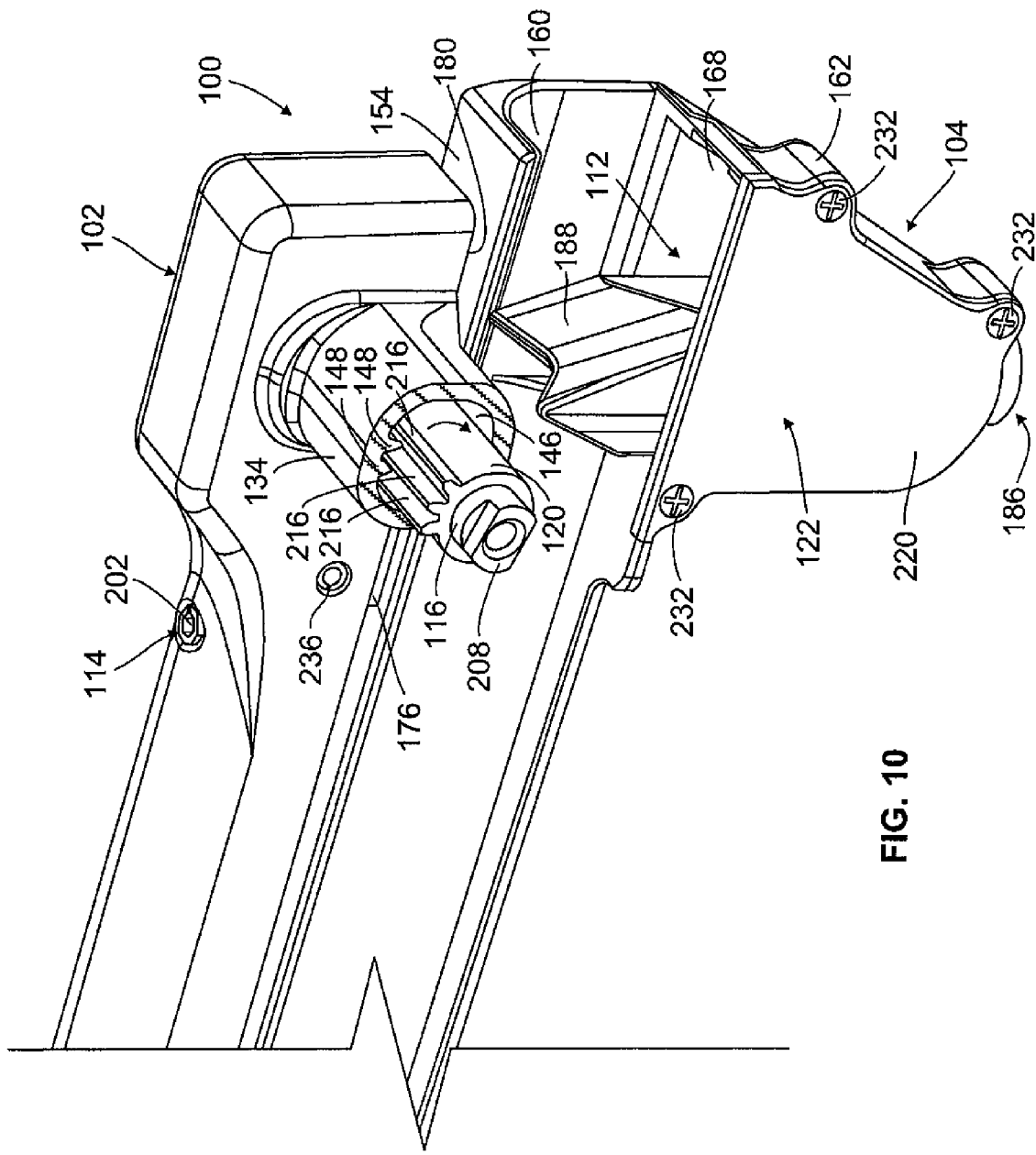
FIG. 10 is an enlarged view of the cable cutter illustrated in FIG. 1 with a handle, hand wheel, and part of a guide housing of the top frame member removed.

Next, the end of the shaft 116 with the boss 208 is inserted through the hole 248 of the bushing 120 until the bushing 120 bottoms out on the second end face 212 of the cam member 118. Then the shaft 116, cam member 118 and bushing 120 are moved through the U-shaped cut-out formed in the second sidewall 128, through the opening 136 of the top frame member 102, through the enlarged cavity 150 of the guide housing 134, and into the slot 146 of the guide housing 134 such that the teeth 148 of the guide housing 134 properly mesh with the teeth 216 of the bushing 120. This movement occurs until the cam member 118 bottoms out against the guide housing 134, as the cam member 118 is larger than the slot 146, such that the cam member 118 is positioned within the cavity or pocket 150 of the guide housing 134, as illustrated in FIG. 10.

Next, the cutting wheel 110 is inserted over the hex-shaped boss 206 of the shaft 116 so that the complementary hex-shaped hole 184 of the cutting wheel 110 lines up therewith and is slid over the hex-shaped boss 206. The cutting wheel 110 is preferably then attached to the shaft 116 by a screw and washer combination 226 (with only the screw being illustrated), while the other end of the shaft 116 is held in place using a wrench or vice. This type of attachment provides the necessary means that allows enough torque to be properly supplied to the cutting wheel 110 without fear of slippage or stripping, although of course it is to be understood that any other suitable type of attachment could alternatively be used.

Next, the slot 182 in the handle 106 is fitted around the complementary shaped boss 208 on the free end of the shaft 116. A screw and washer combination 228 (with only the screw being illustrated) is then used to secure the handle 106 to the shaft 116. This type of attachment creates a connection that can transmit the necessary torque from the handle 106 to the cutting wheel 110 to make the cable cutter 100 work without any problems involving slipping or stripping of the connection, although of course it is to be understood that any other suitable type of attachment could alternatively be used.

In order to complete assembly of the first subassembly, the hand wheel 108 is attached to the other end of the handle 106 by a screw and washer combination 230 (with only the screw being illustrated) that extends through the holes of the hand wheel 108 and the handle 106, respectively.

The second subassembly is formed by first screwing the threaded portion 194 of the thumb knob assembly 186 into the threaded hole (not shown) in the bottom of the cradle member 188. Next, the threaded portion 194 of the thumb knob assembly 186, the cradle member 188 and the leaf spring 190 are inserted into the opening 168 of the bottom frame member 104 such that the ball portion 196 of the thumb knob assembly 186 is seated within the socket portion 166 of the bottom frame member 104. Therefore, one side of the cradle member 188 is flush with the second wall 164 of the bottom frame member 104, and the free end of the leaf spring 190 is pressed against the first wall 162 of the bottom frame member 104. The thumb wheel 192 is positioned outside of the walls 162, 164, 165.

The wall portion 220 of the cover plate 156 is then positioned to close off the opening 168 from the side. The ball portion 196 of the thumb knob assembly 186 becomes seated within the socket portion 222 of the cover plate 122. The holes 224 provided through the wall portion 220 of the cover plate 156 are in alignment with the holes 170 provided through the front and interior walls 162, 164 of the bottom frame member 104. Finally, the cover plate 122 is fastened to the bottom frame member 104 by screws 232 extending through the holes 170, 224. At this point, the socket portions 166, 222 of the bottom frame member 104 and the cover plate 122, respectively, form a rotary connection with the ball portion 196 of the thumb knob assembly 186, such that rotation of the thumb wheel 192 creates linear upward or downward movement of the cradle member 188.

The second subassembly is then attached to the first subassembly. The first generally rectangular-shaped projection 172 of the bottom frame member 104 is placed into the rear of the opening 136 of the top frame member 102 so that the hole 174 of the first generally rectangular-shaped projection 172 lines up with the holes 138, 140 found near the rear of the sidewalls 126, 128 of the top frame member 102. A roll pin 234 is then pressed through all three holes 138, 174, 140, creating a pivoting connection between the top and bottom frame members 102, 104. As such, the cutting wheel 110 becomes aligned with the slot 180 of the bottom frame member 104.

Next, the bottom frame member 104 is manipulated until the hole 178 of the second generally rectangular-shaped projection 176 is aligned with the other holes 138, 140 on the sidewalls 126, 128 of the top frame member 102. A roll pin 236 is pressed through all three of these holes 138, 178, 140, thereby limiting the amount that the top and bottom frame members 102, 104, can be separated from one another. Thus, the top and bottom frame members 102, 104 are prevented from opening too much which could allow the compression spring 204 to inadvertently fall out of the cable cutter 100 when the cable cutter 100 is in use, as will be discussed. It is to be understood that this assembly should be done with the top frame member 102 pointing upward to ensure that the compression spring 204 does not fall off the set screw 202.

Figure 11:
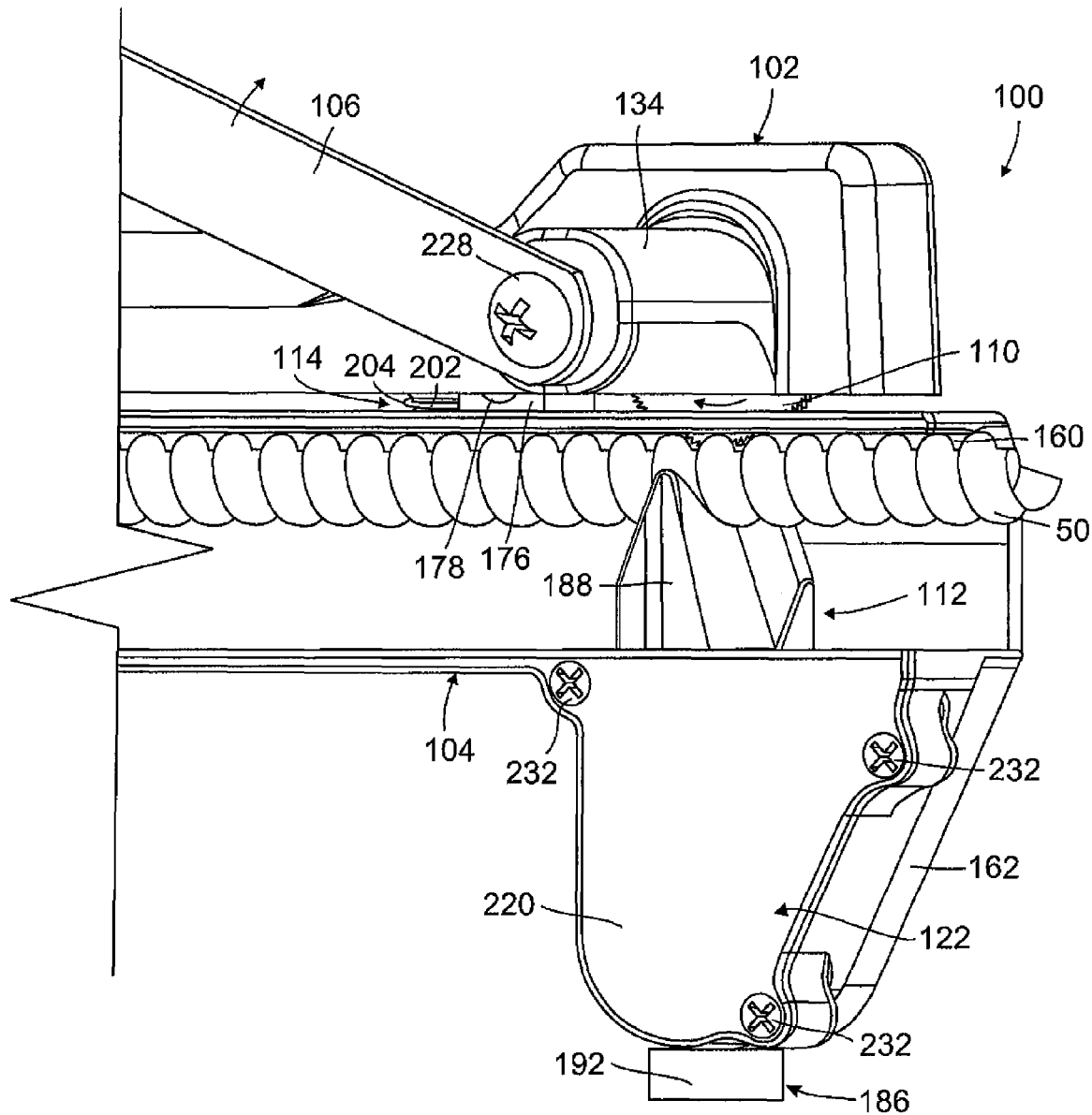
FIG. 11 is an enlarged perspective view of the cable cutter illustrated in FIG. 1 with a flexible cable inserted into a cable receiving groove of the cable cutter.
Figure 12:
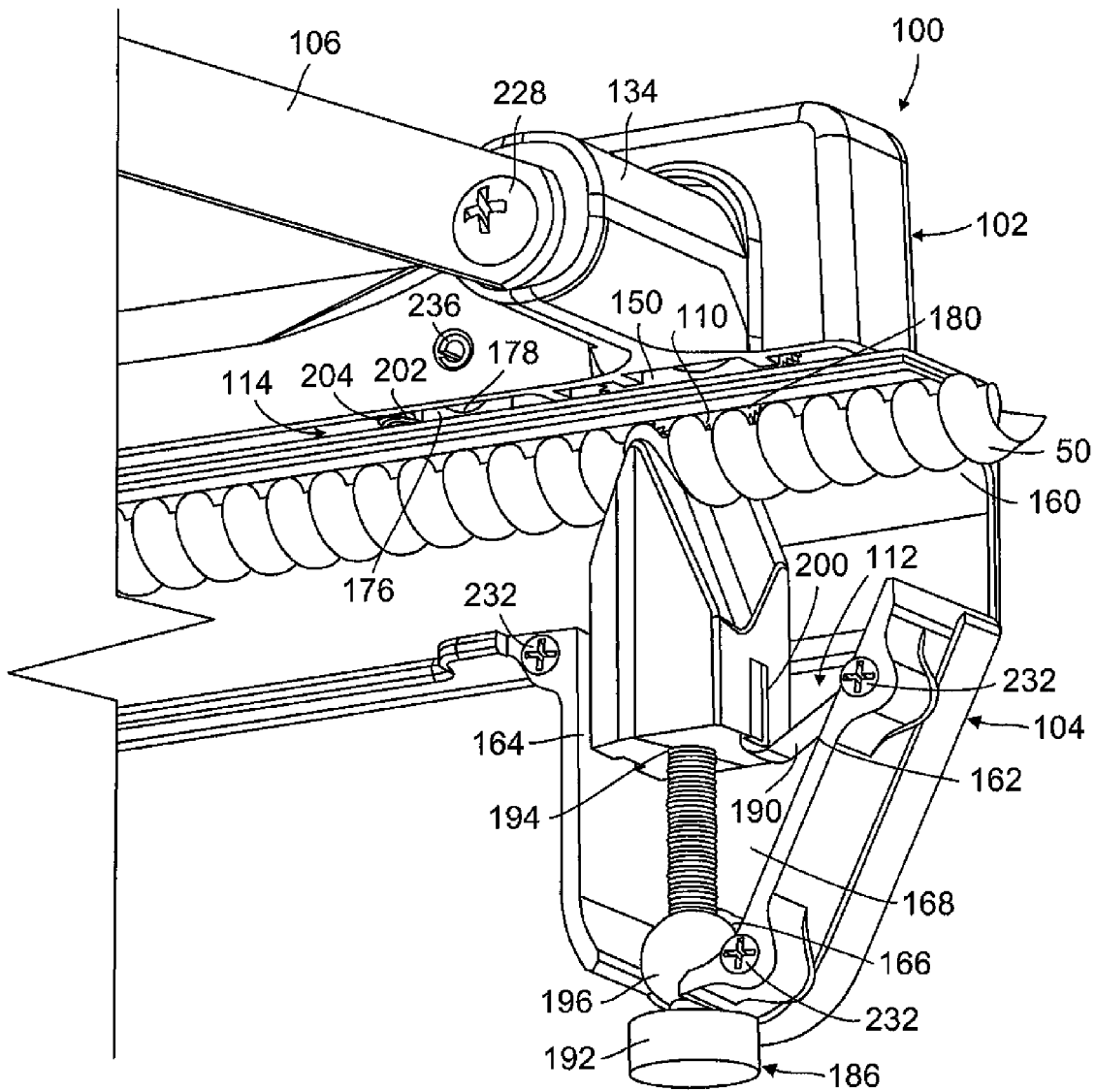
FIG. 12 is an enlarged perspective view of the cable cutter illustrated in FIG. 1 with the cover plate removed so that the internal workings of a clamping mechanism are more readily apparent.
Figure 13:
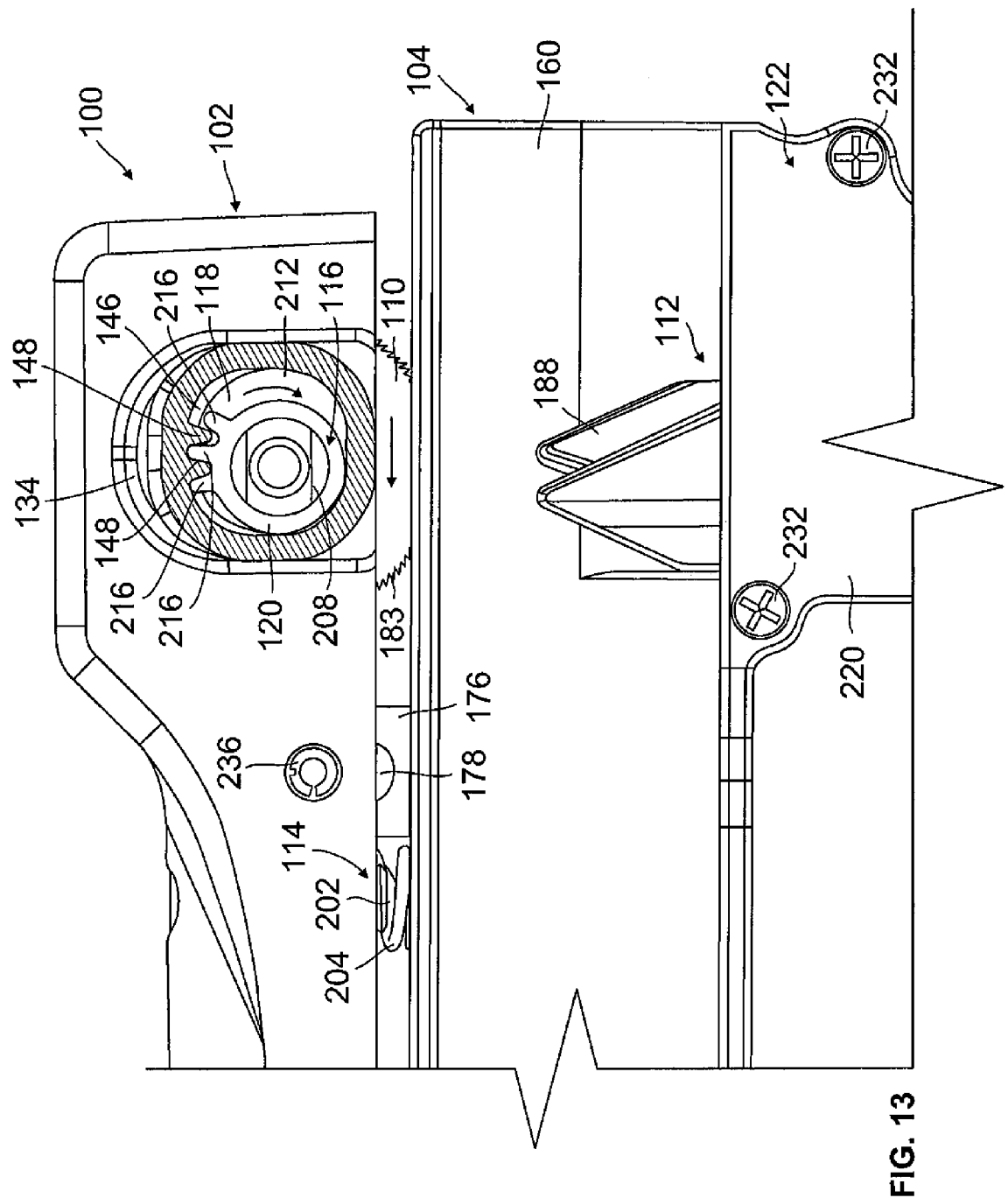
FIG. 13 is a front view of the cable cutter illustrated in FIG. 10 with a cutting wheel in an extreme rear position with respect to the top and bottom frame members.
Figure 14:
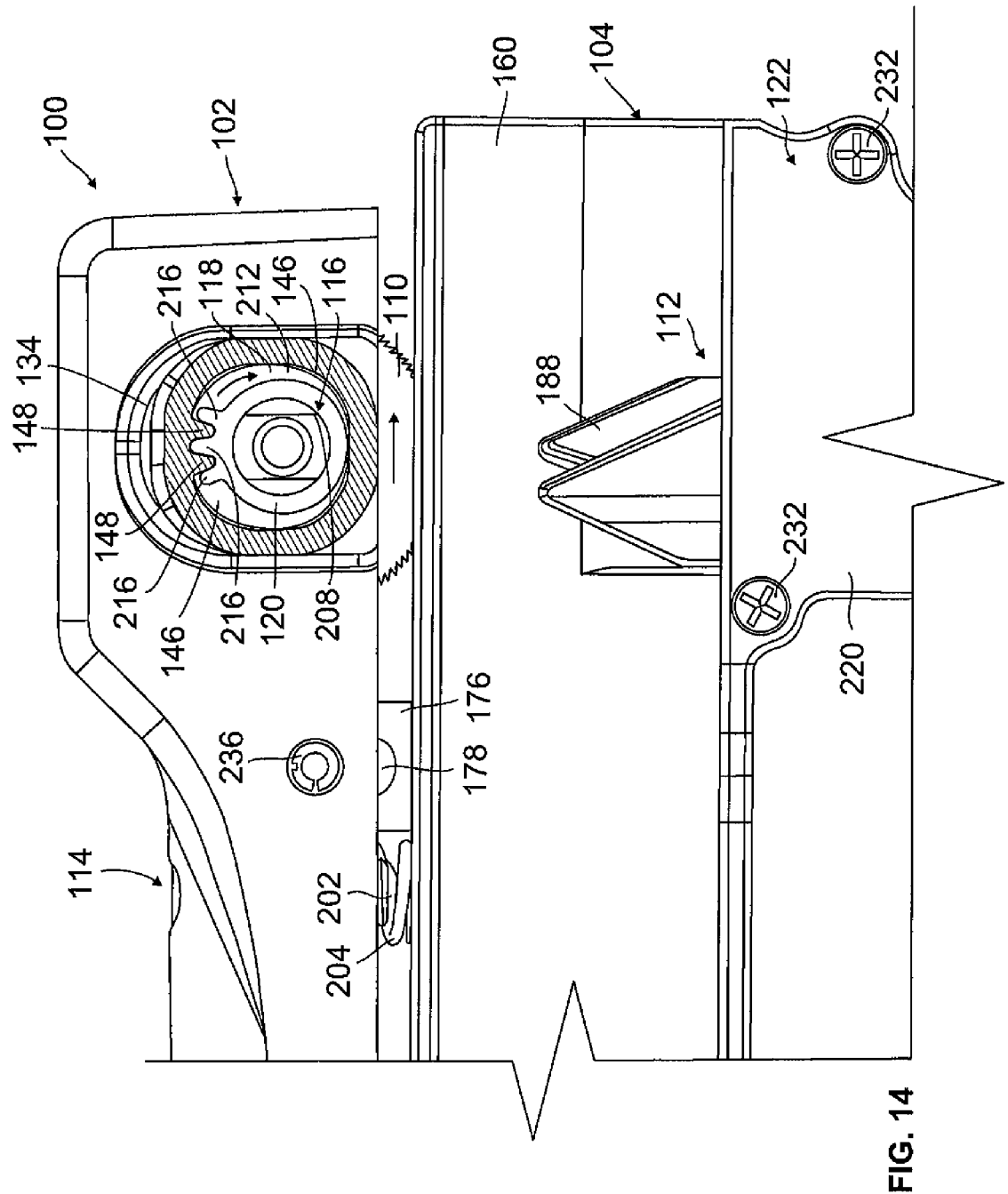
FIG. 14 is a front view of the cable cutter illustrated in FIG. 10 with the cutting wheel in a middle position with respect to the top and bottom frame members.
Figure 15:
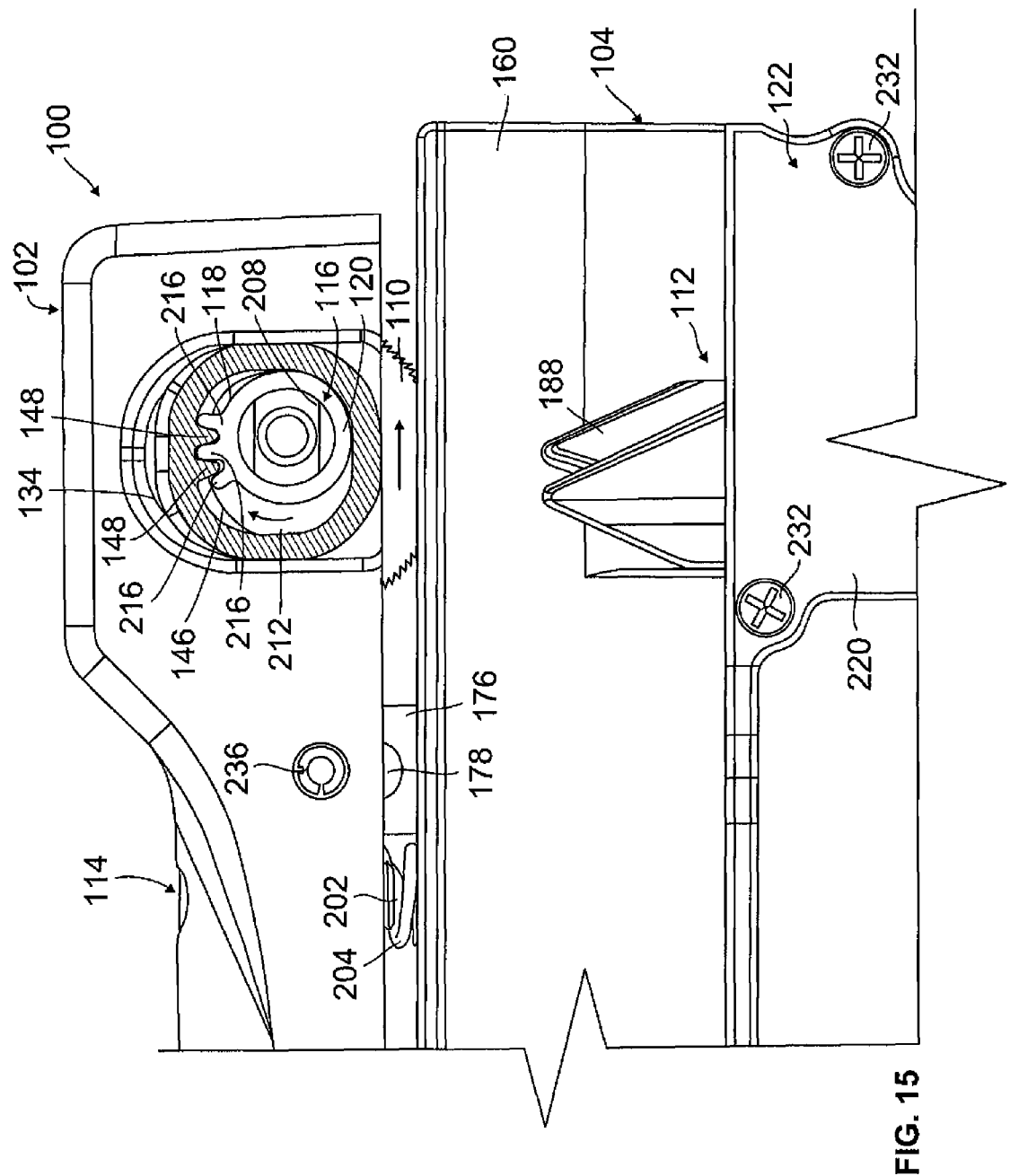
FIG. 15 is a front view of the cable cutter illustrated in FIG. 10 with the cutting wheel in an extreme forward position with respect to the top and bottom frame members.

To operate the cable cutter 100, user first inserts the flexible cable 50 into the cable receiving groove 160 of the bottom frame member 104 such that the area of the flexible cable 50 that is desired to be cut is next to the cutting wheel 110, as illustrated in FIGS. 11 and 12. The user then clamps the flexible cable 50 into place by turning the thumb wheel 192, causing the cradle member 188 to extend upwardly such that the V-shaped portion 198 of the cradle member 188 impinges upon the flexible cable 50 and forces the flexible cable 50 against the upper wall 154 of the bottom frame member 104. It should be noted that other known means for clamping the flexible cable 50 in place could be used and incorporated into the configuration of the cable cutter 100, and these alternate means are considered to be equivalents to the clamping mechanism 112 shown and described herein.

If the flexible cable 50 cannot fit into the cable receiving groove 160 because the cradle member 188 is obstructing insertion of the flexible cable 50, the user must first turn the thumb wheel 192 in the opposite direction, thus causing the cradle member 188 to extend downwardly, until enough clearance has been created for insertion of the flexible cable 50. Then the flexible cable 50 is clamped into position as previously described.

The user then grips the cable cutter 100 in one hand such that the hand wraps around the rear portions of the top and bottom frame members 102, 104, and squeezes them together slightly. The engagement of the roll pin 236 in the elongated hole 178 permits the top frame member 102 to move downwardly toward the bottom frame member 104 once the spring force of the compression spring 204 is overcome, while the roll pin 234 within the hole 174 acts as a pivot between the top and bottom frame members 102, 104. The top and bottom frame members 102, 104 are squeezed together until the cutting wheel 110 passes through the slot 180, which is appropriately sized to allow the cutting wheel 110 to move therethrough. This allows the cutting wheel 110 to contact the shielding of the flexible cable 50.

The user then rotates the handle 106 via the hand wheel 108 so that the cutting wheel 110 will spin in a direction that allows the cutting wheel 110 to cut the shielding of the flexible cable 50 both by rotation and reciprocation. The user must be careful to ensure that the cutting wheel 110 is not rotated in the wrong direction because this could dull the outer cutting edges 183 of the cutting wheel 110 instead of causing the shielding of the flexible cable 50 to be cut. For this particular cable cutter 100, the cutting wheel 110 must rotate in a clockwise direction as shown in FIG. 11 in order to ensure that the outer cutting edges 183 of the cutting wheel 110 are rotating in the correct direction to cut effectively. Of course, it is to be understood that minor changes within the skill set of one of ordinary skill in the art could be made to the cable cutter 100 such that the cutting wheel 110 would be rotated, requiring rotation thereof in a counter-clockwise direction.

As the cutting wheel 110 rotates, it also reciprocates within the slot 180, allowing the user to make a longer cut without changing the depth of cut or increasing the diameter of the cutting wheel 110. The reciprocation of the cutting wheel 110 alleviates the problem of nicking the wires within the flexible cable 50 as previously described. Description of how the reciprocation of the cutting wheel 110 is achieved will be described in detail hereinbelow. Rotation and reciprocation are performed by moving only the handle 106 in a single direction.

After the flexible cable 50 is cut as desired, the flexible cable 50 is unclamped by pushing the flexible cable 50 forward, toward the front end of the cable cutter 100. Such pushing action on the cable 50 forces the cradle member 188 to pivot forwardly and downwardly about the ball portion 196 that is secured between the socket portions 166, 222, which in turn forces the cradle member 188 to compress the leaf spring 190 between the cradle member 188 and the first wall 162, thus overcoming the force of the leaf spring 190. With the cradle member 188 in this forward and downward pivoted position, the cradle member 188 is no longer clamping the flexible cable 50 in place and the flexible cable 50 can then be further pushed/pulled out of the cable receiving groove 160. The cut portion of the flexible cable 50 is then removed by unwrapping it from around the wires within the flexible cable 50.

The depth adjustment mechanism 114 is provided because the user sometimes may have to adjust the depth of the cut based on different types and brands of flexible cable 50 in order to ensure that the shielding of the flexible cable 50 is cut all the way through. The depth adjustment mechanism 114 allows the user to control the maximum amount the cutting wheel 110 extends through the slot 180 which, in turn, limits the depth of the cut the cable cutter 100 can make. With the set screw 202 rotatably attached to the upper wall 124 of the top frame member 102 and able to rest upon the upper wall 154 of the bottom frame member 104, and with the compression spring 204 surrounding the set screw 202 and being trapped between the top and bottom frame members 102, 104, the compression spring 204 is able to bias the top and bottom frame members 102, 104 apart from one another so that the cutting wheel 110 does not naturally extend through the slot 180, which would interfere with the insertion of the flexible cable 50 into the cable receiving groove 160. This configuration of the set screw 202 and the compression spring 204 also allows the user to squeeze the top and bottom frame members 102, 104 together after the flexible cable 50 has been inserted, to overcome the force of the compression spring 204, which causes the cutting wheel 110 to protrude through the slot 180 a variable amount. Hence, the user can then tighten or relax his/her hold on the cable cutter 100 to provide the necessary pressure to make the cable cutter 100 work properly for the particular type of flexible cable 50 to be cut. The set screw 202 will, however, prevent the user from holding the cable cutter 100 too tightly which could cause the cutting wheel 110 to cut too deeply and nick the wires found within the flexible cable 50.

The reciprocation of the cutting wheel 110 is described with reference to FIGS. 13-19. The shaft 116 is not limited to only rotational movement because instead of having the shaft 116 bound by a hole, it is free to translate and rotate within the slot 146. Furthermore, teeth 148 are provided by the guide housing 134, which mesh with the teeth 216 of the bushing 120. Thus, as the handle 106 and cutting wheel 110 begin to rotate, so does the cylindrically-shaped cam member 118 that is off-centered with respect to the shaft 116. As the cam member 118 rotates, the portion of the outer circumferential cam surface 214 that is the furthest away from the axis of the shaft 116 will periodically contact each of the sidewalls 152.

As this portion of the outer circumferential surface 214 of the cam member 118 approaches one of the sidewalls 152, the shaft 116 is forced sideways and the bushing 120 and cutting wheel 110 begin to translate as well as rotate. This motion continues for approximately one-hundred eighty degrees of the rotation of the handle 106. After this, the portion of the outer circumferential cam surface 214 of the cam member 118 that is furthest away from the axis of the shaft 116 will begin to approach the other sidewall 152 as the handle 106 continues to rotate, which then causes the cutting wheel 110 and shaft 116 to translate in the other direction, retracing its original path. This creates the reciprocating motion of the cutting wheel 110 which allows flexible cable 50 to be sliced with a longer cut without having to increase the depth of the cut and the associated risk of nicking the insulation of wiring found within the flexible cable 50. The outer circumferential cam surface 214 is preferably always in contact with both of the sidewalls 152 such that two lines of contact are provided between the cam member 118 and the top frame member 102.

The roles of the teeth 216 of the bushing 120 and of the teeth 148 of the guide housing 134 are to make sure that the cutting wheel 110 and shaft 116 cannot move up or down or twist in any direction, keeping the shaft 116 perpendicular to the top and bottom frame members 102, 104, and consequently the flexible cable 50, at all times. Thus, the cutting wheel 110 does not wobble, but rather cuts with precise rotary and translating motions.

Figure 20:
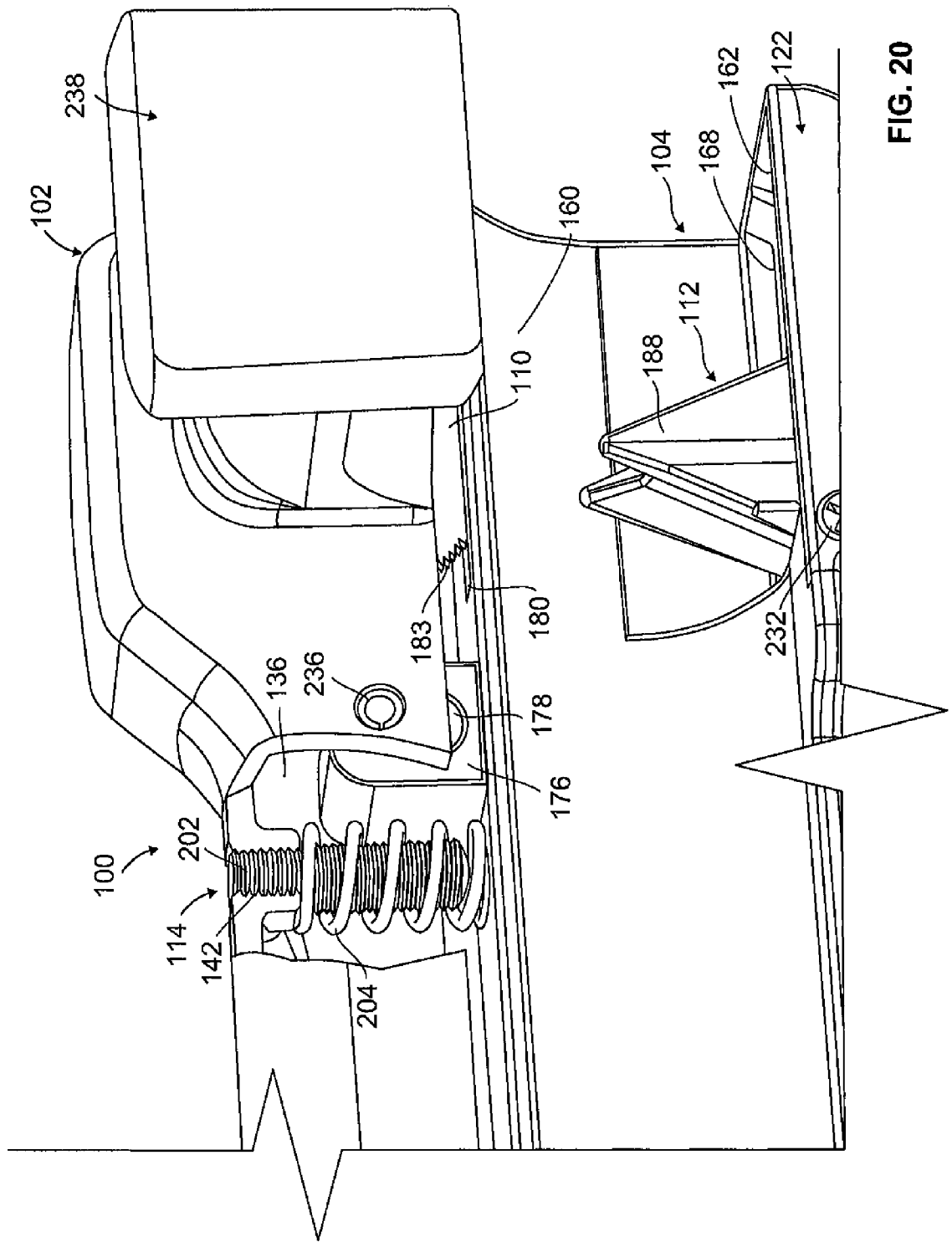
FIG. 20 is an enlarged view of an alternative cable cutter to that as illustrated in FIG. 1, with the handle and hand wheel being replaced by an automatic or electric motor, and with part of a top frame member removed so that the components of a depth adjustment mechanism can be more easily seen.

It should be noted that, rather than causing the cutting wheel 110 to cut the flexible cable 50 by hand power with the handle 106 and the hand wheel 108, the cable cutter 100 could alternatively be powered automatically using, for example, an electric motor 238 that is connected to the shaft 116, as illustrated in FIG. 20, for causing rotation of the shaft 116.

Figure 21:
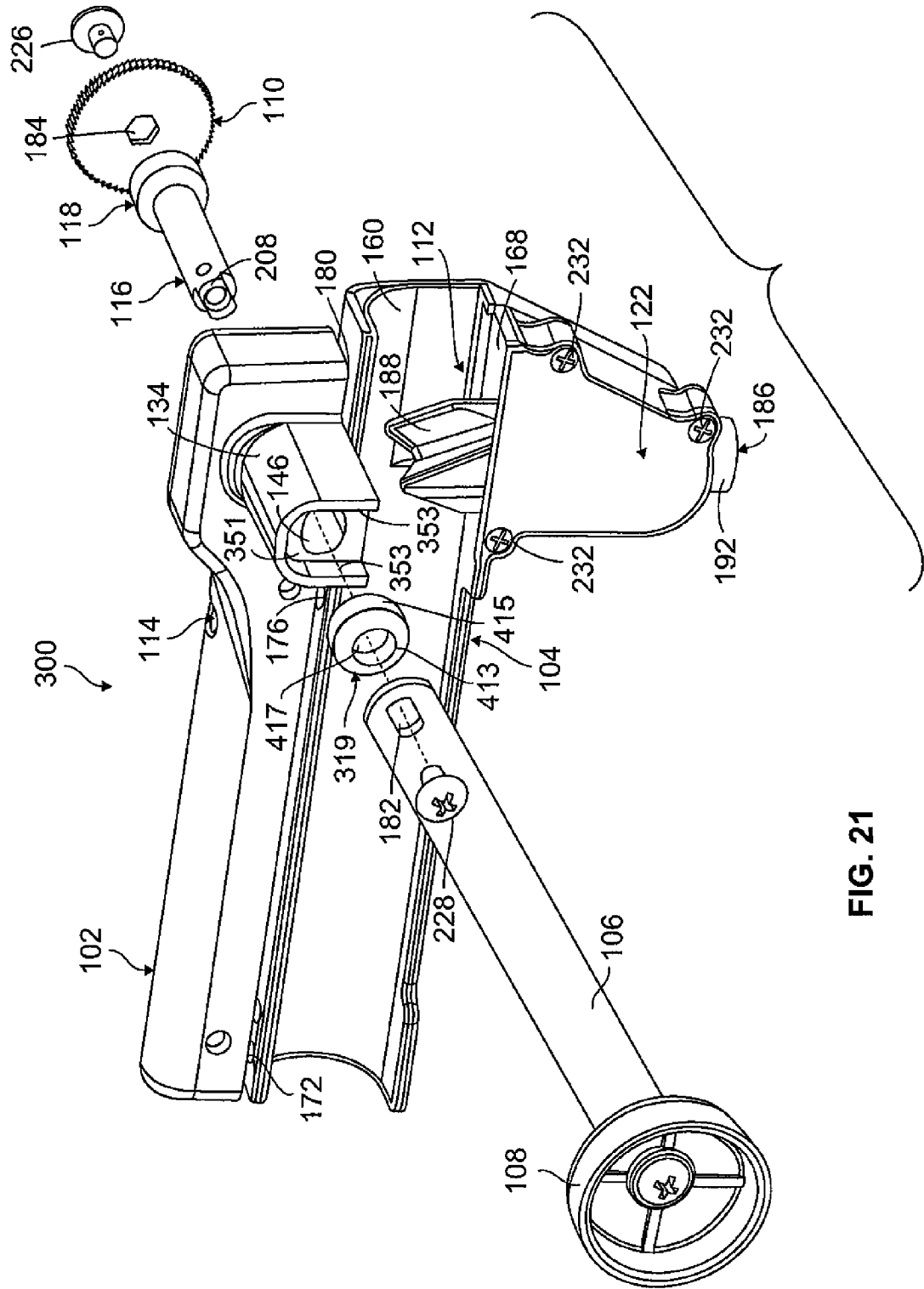
FIG. 21 is an exploded assembly view of a second embodiment of the cable cutter which incorporates features of the present invention.

Attention is invited to FIG. 21 and the cable cutter 300 which incorporates the features of the second embodiment of the invention. The cable cutter 300 is identical to the cable cutter 100, except as described herein and as illustrated in FIG. 21. In cable cutter 300, the guide housing 134 is not provided with the elongated teeth 148 that extend into the slot 146. The slot 146 also does not extend all the way to the free end 144 of the guide housing 134, but rather is recessed back from the free end 144 such that sidewalls 353 are provided, which are similar to the sidewalls 152, by the guide housing proximate to the free end 144 thereof. An enlarged cavity or pocket 351 is provided between the sidewalls 353 and the slot 146. A second cam member 319 is also provided. The second cam member 319 is generally cylindrical and has a first end face (not shown) and an opposite second end face 413 that are connected by an outer circumferential cam surface 415. The cam member 319 has a hole 417 which extends therethrough from the first end face to the second end face 413, but the hole 417 is provided off-center such that portions of the outer circumferential cam surface 415 are provided at a distance further away from the hole 417 than other portions of the outer circumferential cam surface 415.

The second cam member 319 is secured around the second end of the shaft 116, similar to the way in which the first cam member 118 is secured around the first end of the shaft 116, preferably by a set screw (not shown). The second cam member 319 is position within the enlarged cavity or pocket 351 of the guide housing 134 and its angular position relative to the shaft 116 is the same as that of the first cam member 118. The top frame member 102 is then sandwiched between the first and second cam members 118, 319, whose faces contact the ends of their respective cavities 150, 351, which help to prevent the shaft 116 and cutting wheel 110 from twisting or wobbling. At the same time, the slot 146 prevents the cutting wheel 110 from moving up or down. This second embodiment of the cable cutter 300 then works like the first embodiment of the cable cutter. 100 in all other aspects as both cam members 118, 319 contact the sidewalls 152, 353 of the respective cavities 150, 351 within which they are seated. The outer circumferential cam surface 415 is preferably always in contact with both of the sidewalls 353 such that two lines of contact are provided between the cam member 319 and the top frame member 102.

Figure 22:
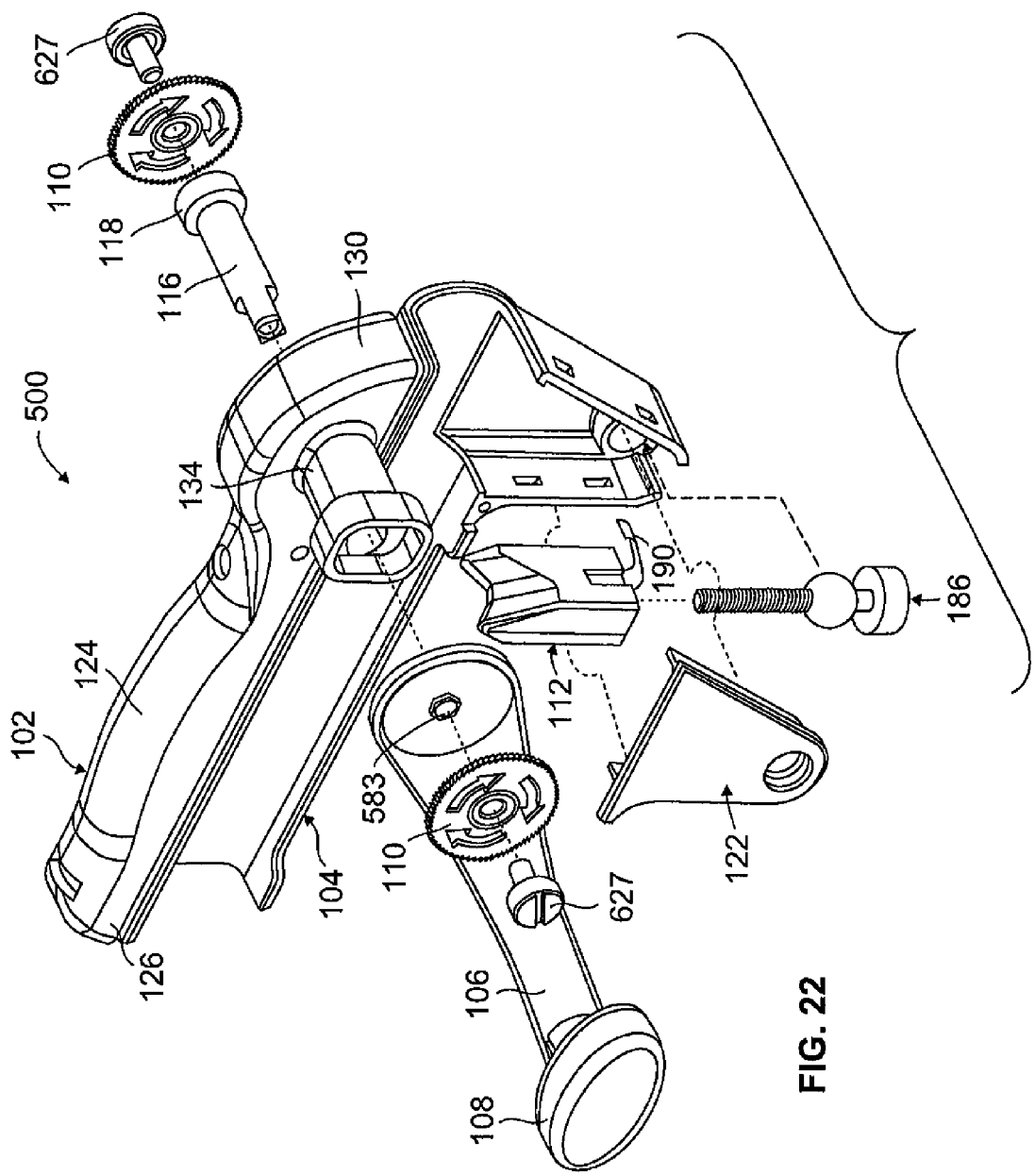
FIG. 22 is an exploded assembly view of a third embodiment of the cable cutter which incorporates features of the present invention.
Figure 23:
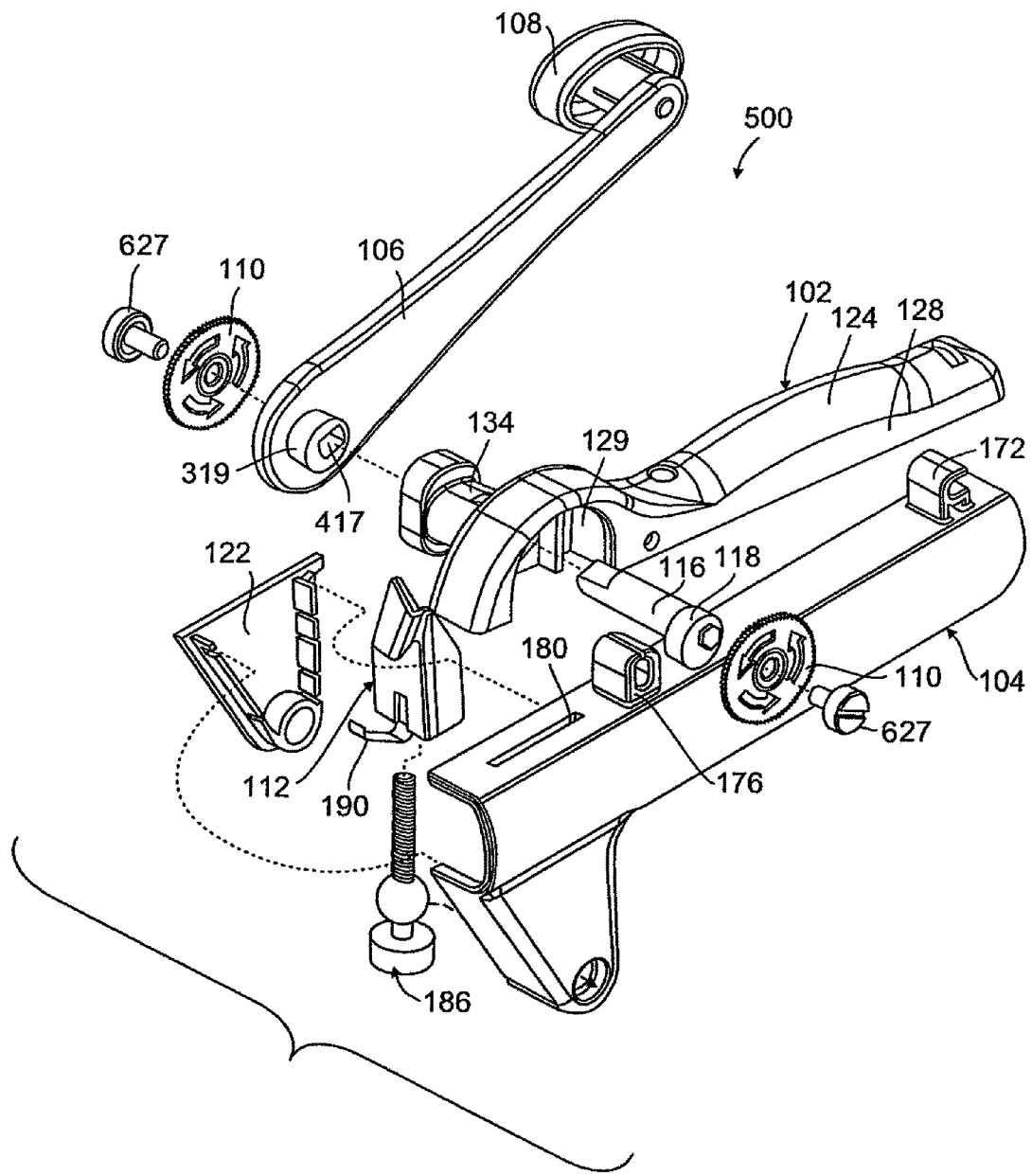
FIG. 23 is an alternative exploded assembly view of the third embodiment of the cable cutter.

Attention is now invited to FIGS. 22 and 23 and the cable cutter 500 which incorporates the features of the third embodiment of the present invention. The cable cutter 500 is identical to the cable cutter 300, except as described herein and as illustrated in FIGS. 22 and 23. In cable cutter 500, the second cam member 319 is integrally formed with the handle 106 such that the hole 417 is in alignment with the slot 182 of the handle 106. The handle 106 and the cam member 319 are preferably injection molded of nylon in order to decrease the cost of manufacturing. As discussed in the first embodiment of the cable cutter 100, the shaft 116 and the cam member 118 are preferably integrally formed in the cable cutter 500 with a timing feature at one end in order to ensure proper alignment with the integrally formed handle 106 and cam member 319.

The handle 106 is provided with an enlarged section around the aperture 583, opposite the cam member 319, that is sized and configured to store replacement cutting wheels or blades 110. Thumb screws 627, rather than the screw and washer combinations 226, 228, are preferably used in order to ease assembly and disassembly of cutting wheel 110 replacement. The cutting wheel 110 is preferably metal injection molded for cost effectiveness.

As can be seen, the cable cutters 100, 300, 500 of the first, second and third embodiments of the invention each allow a user to make longer slices into flexible cable 50, an in particular BX cable, without increasing the depth of cut. Hence, the cable cutters 100, 300, 500 can work on a greater range of cable diameters including three-eights of an inch through one inch diameters without the risk of nicking the insulation of the wires contained within these flexible cables 50. Although this has been achieved by using the structures and methods described and illustrated herein, it is within the realm of one of ordinary skill in the art to achieve the same result, namely a reciprocating cutting wheel 110, in other equivalent manners, for instance by using linkages.

It is to be understood that any of the features of the cable cutters 100, 300, 500 as described or illustrated herein could be incorporated into any of the other cable cutters 100, 300, 500 whenever feasible.

While preferred embodiments of the present invention are shown and described, it is envisioned that those skilled in the art may devise various modifications of the present invention without departing from the spirit and scope of the foregoing description, the attached drawings and the appended claims.

The invention is claimed as follows:

1. A cutting tool for cutting a workpiece comprising:
   a frame;
   a shaft rotatable about an axis;
   a cutter coupled to said shaft such that rotation of said shaft about said axis causes rotation of said cutter about said axis;
   a cam affixed to said shaft such that said cam is non-rotatable relative to said shaft, said cam having a cam surface which is distanced away from said axis of said shaft a varying amount; and
   means affixed to said shaft for causing rotation of said shaft and said cam relative to said frame;
   wherein rotation of said shaft and said cam by said means causes said cam to contact said frame, said contact causes said shaft and said cutter to reciprocate in a generally transverse direction relative to said axis of said shaft.

2. The cutting tool as defined in claim 1, wherein said means comprises a handle, said shaft configured to be rotated by manual manipulation of said handle.

3. The cutting tool as defined in claim 1, wherein said means comprises a motor, said shaft configured to be automatically rotated by said motor.

4. The cutting tool as defined in claim 1, wherein said cam is positioned within a pocket at least partially formed by two facing walls of said frame, said cam surface of said cam contacts each of said walls simultaneously in order to provide two lines of contact between said cam and said frame.

5. The cutting tool as defined in claim 1, further comprising a bushing which is positioned around said shaft, said bushing having at least one tooth extending outwardly therefrom, said at least one tooth configured to engage with at least one extending tooth of said frame.

6. The cutting tool as defined in claim 1, further comprising a second cam coupled to said shaft such that said second cam engages said frame upon rotation of said shaft.

7. The cutting tool as defined in claim 6, wherein said means comprises a handle, said shaft configured to be rotated by manual manipulation of said handle, said second cam being integrally formed with said handle.

8. The cutting tool as defined in claim 6, wherein an angular position of said second cam relative to said shaft is identical to an angular position of said first defined cam, where said angular position of said first defined cam is defined by said cam surface being distanced away from said axis of said shaft said varying amount.

9. The cutting tool as defined in claim 6, wherein said first defined cam is positioned within a first pocket at least partially formed by first and second facing walls of said frame, said cam surface of said first defined cam contacts each of said first and second walls simultaneously in order to provide two lines of contact between said first defined cam and said frame, and wherein said second cam is positioned within a second pocket at least partially formed by third and fourth facing walls of said frame, a cam surface of said second cam contacts each of said third and fourth walls simultaneously in order to provide two lines of contact between said second cam and said frame.

10. The cutting tool as defined in claim 1, wherein said frame provides a portion thereof for receiving a cable to be cut by said cutter, and further comprising a clamping mechanism which is configured to be moved between at least first and second positions, wherein in said first position said clamping mechanism is configured to secure the cable in place within said portion of said frame such that the cable can be cut by said cutter, and wherein in said second position said clamping mechanism is configured to allow the cable to be inserted into or removed from said portion of said frame.

11. The cutting tool as defined in claim 10, further comprising a thumb knob assembly which is secured to said frame and to said clamping mechanism, said thumb knob assembly configured to move said clamping mechanism between said at least first and second positions.

12. The cutting tool as defined in claim 1, wherein said cutter is a circular saw Member.

* * * * *